US006894668B2

(12) United States Patent
Mi et al.

(10) Patent No.: US 6,894,668 B2
(45) Date of Patent: May 17, 2005

(54) GENERAL 2 VOLTAGE LEVELS DRIVING SCHEME FOR CHOLESTERICAL LIQUID CRYSTAL DISPLAYS

(75) Inventors: Xiang-Dong Mi, Rochester, NY (US); Stanley W. Stephenson, Spenceport, NY (US)

(73) Assignee: Eastman Kodak Company, Rochester, NY (US)

( * ) Notice: Subject to any disclaimer, the term of this patent is extended or adjusted under 35 U.S.C. 154(b) by 397 days.

(21) Appl. No.: 10/138,985

(22) Filed: May 3, 2002

(65) Prior Publication Data

US 2003/0206147 A1 Nov. 6, 2003

(51) Int. Cl.$^7$ ................................................. G09G 3/36
(52) U.S. Cl. ........................................ 345/87; 345/89
(58) Field of Search .............................. 345/50, 87, 94, 345/95, 100, 204, 214; 349/86, 169, 175, 185

(56) References Cited

U.S. PATENT DOCUMENTS

| | | | |
|---|---|---|---|
| 4,435,047 A | 3/1984 | Fergason | 349/86 |
| 5,251,048 A | 10/1993 | Doane et al. | 345/87 |
| 5,437,811 A | 8/1995 | Doane et al. | 349/86 |
| 5,503,952 A | 4/1996 | Suzuki et al. | 430/7 |
| 5,644,330 A | 7/1997 | Catchpole et al. | 345/95 |
| 5,748,277 A | 5/1998 | Huang et al. | 349/169 |
| 6,154,190 A | 11/2000 | Yang et al. | 345/94 |
| 6,198,466 B1 * | 3/2001 | Morich et al. | 345/95 |
| 6,268,840 B1 | 7/2001 | Huang | 345/94 |
| 6,518,944 B1 * | 2/2003 | Doane et al. | 345/87 |
| 2002/0186182 A1 * | 12/2002 | Stephenson et al. | 345/50 |
| 2003/0122758 A1 * | 7/2003 | Lee et al. | 345/89 |
| 2003/0169221 A1 * | 9/2003 | Stephenson et al. | 345/87 |
| 2004/0125056 A1 * | 7/2004 | Mi | 345/87 |

OTHER PUBLICATIONS

A. Rybalochka et al. (Dynamic Drive Scheme for Fast Addressing of Cholesteric Displays, SID 2000, pp. 818–821).
A. Kozachenko et al. (Hysteresis as a Key Factor for the Fast Control of Reflectivity in Cholesteric LCDs, Institute of Semiconductor Physics, Pr. Nauki 45, 252650, Kyiv, Ukraine, SID 97 Digest, pp. 148–151).
X.–Y. Huang et al.,22.3: Dynamic Drive for Bistable Reflective Cholesteric Displays: A Rapid Addressing Scheme, SID 95 Digest, pp. 347–350.
X.–Y. Huang et al., 36.3: Unipolar Implementation for the Dynamic Drive Scheme of Bistable Reflective Cholesteric Displays, SID 97 Digest, pp. 899–9022.
V. Sorokin (Simple Driving Methods for Cholesteric Reflective LCDs, Asia Display 1998, pp. 749–752).
X.–Y. Huang et al., High–Performance Dynamic Drive Scheme for Bistable Reflective Cholesteric Displays, SID 96 Digest, pp. 359–362.
Y.–M. Zhu et al., 9.1: High–Speed Dynamic Drive Scheme for Bistable Reflective Cholesteric Displays, SID 97 Digest, pp. 97–100.
A. Rybalochka et al. (Simple Drive scheme for Bistable Cholesteric LCDs, SID 2001, pp. 882–885).

* cited by examiner

Primary Examiner—Amare Mengistu
(74) Attorney, Agent, or Firm—Kathleen Neuner Manne

(57) ABSTRACT

A driving scheme for chiral nematic (cholesteric) liquid crystal displays comprises a preparation step, a holding-selection step, and an evolution step. The column and row drivers require only 2 voltage levels: U or 0. Duty cycles and phases in the preparation step, the holding-selection step, and the evolution step, are varied to generate optimized contrast, brightness, and gray levels on cholesteric liquid crystal displays.

41 Claims, 22 Drawing Sheets

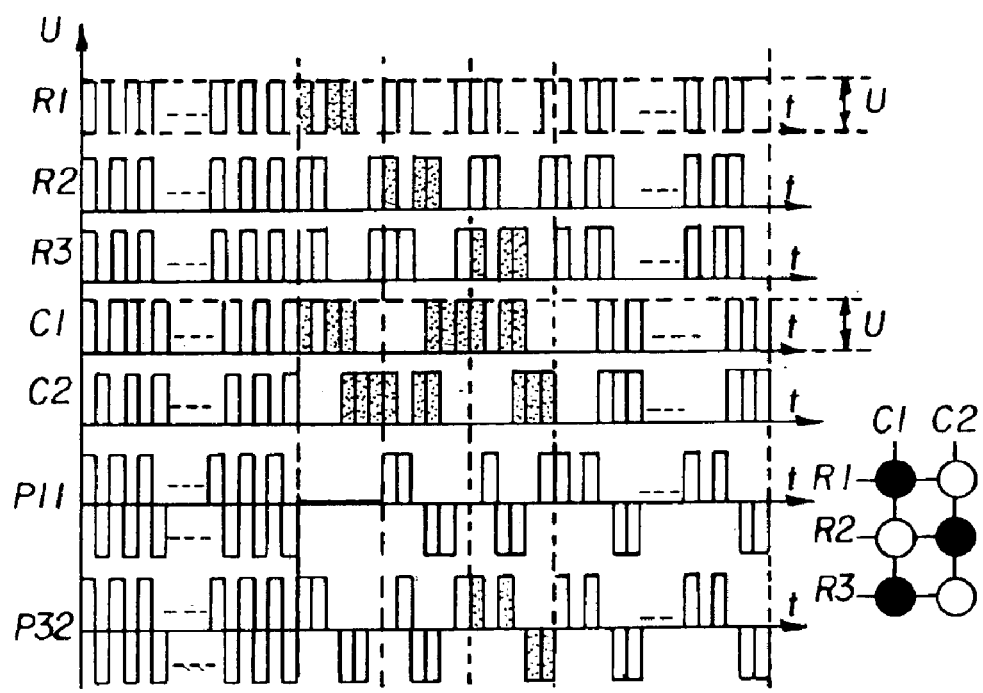
FIG. 3C.1
(Prior Art)
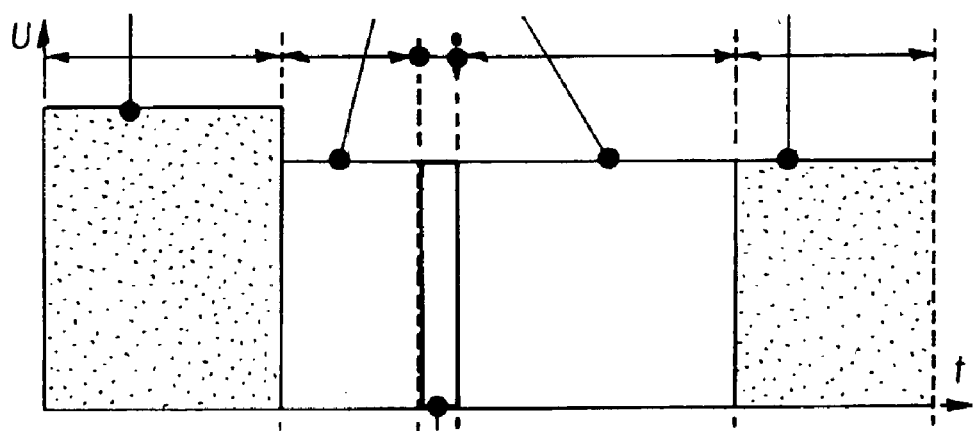
FIG. 3C.2
(Prior Art)

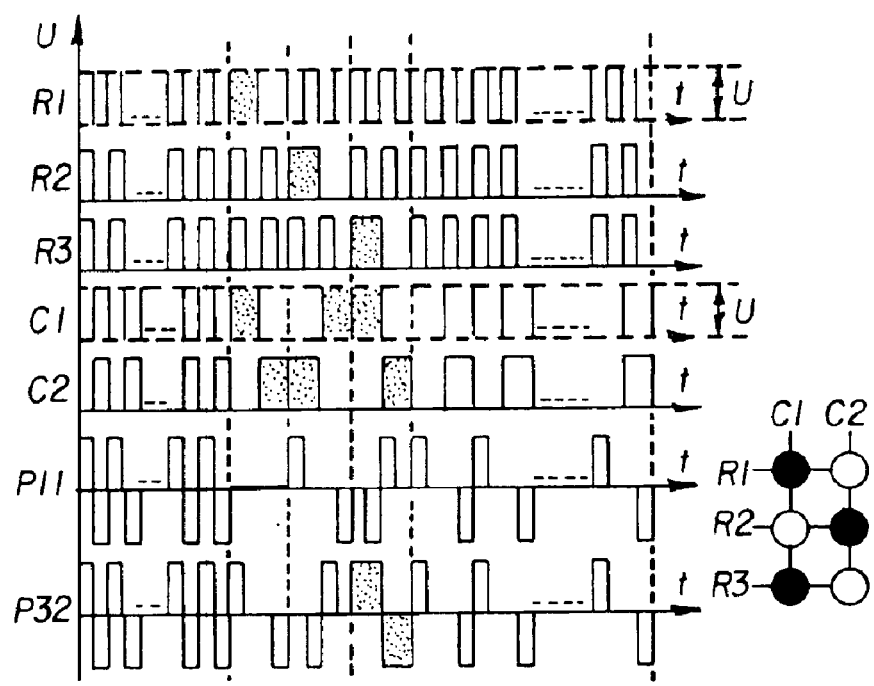
FIG. 3D.1
(Prior Art)
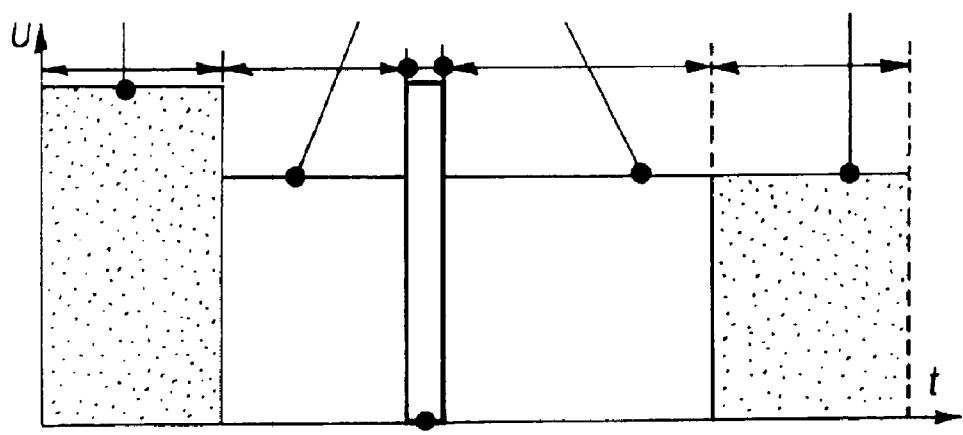
FIG. 3D.2
(Prior Art)

GENERAL 2 VOLTAGE LEVELS DRIVING SCHEME FOR CHOLESTERICAL LIQUID CRYSTAL DISPLAYS

CROSS REFERENCE TO RELATED APPLICATION

Reference is made to commonly assigned U.S. patent application Ser. No. 09/379,776, filed Aug. 24, 1999 by Dwight J. Petruchik et al.; U.S. patent application Ser. No. 09/723,389, filed Nov. 28, 2000 by David M. Johnson et al.; U.S. patent application Ser. No. 09/851,868, filed May 9, 2001 by Stanley W. Stephenson et al.; and U.S. patent application Ser. No. 09/923,659, filed Aug. 7, 2001 by Xiang-Dong Mi et al., the disclosures of which are incorporated herein by reference.

FIELD OF THE INVENTION

The present invention relates to cholesteric (chiral nematic) liquid crystal displays and their electrical drive schemes, which provide high-speed writing of the display at a low cost.

BACKGROUND OF THE INVENTION

Information can be displayed on sheets of paper carrying permanent inks or displayed on electronically modulated surfaces such as cathode ray displays or liquid crystal displays (LCDs). Magnetic sheet materials can carry magnetically writable areas for ticketing or financial information, but magnetically written data is not visible.

Flat panel LCDs use two transparent glass plates as substrates. In a typical embodiment, such as one set forth in U.S. Pat. No. 5,503,952, a set of electrical traces is sputtered in a pattern of parallel lines that form a first set of conductive traces. A second substrate is similarly coated with a set of traces having a transparent conductive coating. Coatings are applied and the surfaces rubbed to orient liquid crystals. The two substrates are spaced apart and the space between the two substrates is filled with a liquid crystal material. Pairs of conductors from either set are selected and energized to alter the optical transmission properties of the liquid crystal material. Such displays are expensive.

Fabrication of flexible, electronically written display sheets using conventional nematic liquid crystals materials is disclosed in U.S. Pat. No. 4,435,047. A first sheet has transparent indium-tin-oxide (ITO) conductive areas and a second sheet has electrically conductive inks printed on display areas. The sheets can be thin glass, but in practice have been formed of Mylar polyester. A dispersion of liquid crystal material in a binder is coated on the first sheet, and the second sheet is bonded to the liquid crystal material. Electrical potential is applied to opposing conductive areas to operate on the liquid crystal material and expose display areas. The display uses nematic liquid crystal materials, which ceases to present an image when de-energized. Privacy windows are created from such materials using the scattering properties of conventional nematic liquid crystals. Nematic liquid crystals require continuous electrical drive to remain transparent.

U.S. Pat. No. 5,437,811 discloses a light-modulating cell having a chiral nematic liquid crystal (cholesteric liquid crystal) in polymeric domains contained by conventional patterned glass substrates. The chiral nematic liquid crystal has the property of being driven between a planar state reflecting a specific visible wavelength of light and a light scattering focal conic state. Chiral nematic material has two stable slates and can maintain one of the stable states in the absence of an electric field. Consequently, chiral nematic displays have no limit on the number of lines that can be addressed. U.S. Pat. Nos. 5,251,048 and 5,644,330 disclose various driving methods to switch chiral nematic materials between its stable states. However, the update rate of these displays is far too slow for most practical applications. Typically, the update rate was about 10–40 milliseconds per line. It would take a 10–40 seconds to update a 1000 line display.

U.S. Pat. Nos. 5,748,277 and 6,154,190 disclose fast driving schemes for chiral nematic displays, which are called dynamic driving schemes. The dynamic driving schemes generally consist of preparation step, pre-holding step, selection step, post-holding step, and evolution step. Those fast driving schemes require very complicated electronic driving circuitry. For example, all column and row drivers must output bi-polar and multiple level voltages. During the image writing, due to pipeline algorithm, there is an undesirable black bar shifting over the frame. U.S. Pat. No. 6,268,840 discloses a unipolar waveform drive method to implement the above-mentioned dynamic driving schemes. However, because the amplitude of voltages required in the preparation step, the selection step, and the evolution step are distinct, both column and row drivers are required to generate multilevel unipolar voltages, which is still undesirable.

Kozachenko et al. (Hysteresis as a Key Factor for the Fast Control of Reflectivity in Cholesteric LCDs, Conference Record of the IDRC 1997, pp. 148–151), Sorokin (Simple Driving Methods for Cholesteric Reflective LCDs, Asia Displays 1998, pp. 749–752), and Rybalochka et al. (Dynamic Drive Scheme for Fast Addressing of Cholesteric Displays, SID 2000, pp. 818–821; Simple Drive scheme for Bistable Cholesteric LCDs, SID 2001, pp. 882–885) proposed $U/\sqrt{2}$ and $U/\sqrt{3/2}$ dynamic driving schemes requiring only 2-level column and row drivers, which output either U or 0 voltage. These drive schemes do not produce undesirable black shifting bars, instead, they cause the entire frame to go black during the writing. However, as their names suggest, they can be applied only to those cholesteric liquid crystal displays with very specific electrooptical properties, such as $U_{holding}=U_{evolution}=U/\sqrt{2}$ for the $U/\sqrt{2}$ dynamic drive scheme, or $U_{holding}=U_{evolution}=U/\sqrt{3/2}$ for the $U/\sqrt{3/2}$ dynamic drive scheme, where $U_{holding}$ and $U_{evolution}$ are effective voltages (root mean square voltages) of their holding step and evolution step, respectively. Because of this limit, many cholesteric liquid crystal displays either cannot be driven by these schemes, or can be driven only with compromising contrast and brightness. Therefore, there is a need for a simple, low cost, and fast drive scheme for cholesteric liquid crystal displays without sacrificing their contrast and brightness. In addition, the prior art schemes do not teach how to achieve multiple gray levels by using a 2-level voltage driving method.

SUMMARY OF THE INVENTION

The present invention provides one or more of the following features or objectives. Those skilled in the art understand that one or more of the features and objectives can be emphasized and that emphasizing one of the features may reduce the effectiveness of other features. The invention provides a fast and low cost driving scheme which can be applied to a broad arrange of cholesteric liquid crystal displays, and can achieve optimized contrast and brightness. This is achieved by a drive scheme comprising the preparation step, holding-selection step, and evolution step. Its cost is low because both the row and column drivers require only two voltage outputs: U or 0. It achieves high contrast and brightness by varying duty cycle, period (or frequency), and phase of preparation step, holding-selection step, and evolution step.

The invention also provides a fast and low cost driving scheme for cholesteric liquid crystal displays, which produces a plurality of gray levels by using row and column drivers which only output two voltage levels: U or 0. The fast and low cost driving scheme of the invention also produces a bipolar field across all pixels with the same duty cycle and total duration counted from the time when the image data is written in the holding-selection phase, therefore providing uniform contrast and brightness across all rows. The invention uses a preparation step comprising at least two different duty cycles, therefore providing uniform contrast and brightness across all rows. For row drivers, the output is either $U_{row}$ or 0. For column drivers, the output is either $U_{column}$ or 0. In general $U_{row}$ and $U_{column}$ may not be identical, but in preferred embodiments $U_{row}$ and $U_{column}$ are substantially equal. In the followings, both $U_{row}$ and $U_{column}$ shall be referenced as U.

The invention has several advantageous technical effects. It writes pixels to either ON or OFF state using pulses that have only 2-levels: a maximum level, U and a minimum level, 0. This reduces the complexity of the electronics so that the only one voltage generator is needed for the display. Instead of multiple voltage level pulses, the invention uses one 2-level pulse with phase shifting techniques to write pixels ON or OFF and to adjust the gray level of pixels.

BRIEF DESCRIPTION OF THE DRAWINGS

FIGS. 3C.1 and 3C.2 are a $U/\sqrt{3/2}$ dynamic driving scheme (prior art);

FIGS. 3D.1 and 3D.2 are a $U/\sqrt{2}$ dynamic driving scheme (prior art);

FIGS. 12A–2C show comparative results of reflectance and contrast for different maximum voltages and various evolution times.

DETAILED DESCRIPTION OF THE INVENTION

Figure 1:
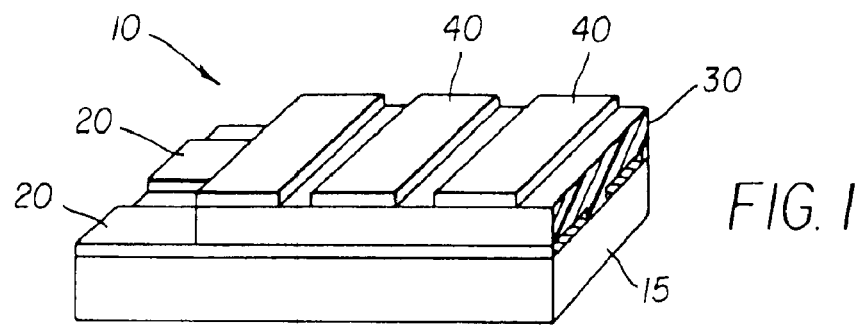
FIG. 1 is an isometric partial view of a cholesteric liquid crystal display.

FIG. 1 is an isometric partial view of a structure for a display 10 made in accordance with the invention. Display 10 includes a flexible substrate 15, which is a thin transparent polymeric material, such as Kodak Estar film base formed of polyester plastic that has a thickness of between 20 and 200 microns. In an exemplary embodiment, substrate 15 can be a 125 micron thick sheet of polyester film base. Other polymers, such as transparent polycarbonate, can also be used.

Electrodes in the form of first patterned conductors 20 are formed over substrate 15. First patterned conductors 20 can be tin-oxide or indium-tin-oxide (ITO), with ITO being the preferred material. Typically, the material of first patterned conductors 20 is sputtered as a layer over substrate 15 having a resistance of less than 250 ohms per square. The layer is then patterned to form first patterned conductors 20 in any well known manner. Alternatively, first patterned conductors 20 can be an opaque electrical conductor material such as copper, aluminum, or nickel. If first patterned conductors 20 are opaque metal, the metal can be a metal oxide to create light absorbing first patterned conductors 20. First patterned conductors 20 are formed in the conductive layer by conventional photolithographic or laser etching means.

A light modulating material such as a polymer dispersed cholesteric layer 30 overlays first patterned conductors 20. In a preferred embodiment, the polymer dispersed cholesteric layer 30 includes a polymeric host material and dispersed cholesteric liquid crystal materials, such as those disclosed in U.S. Pat. No. 5,695,682, the disclosure of which is incorporated by reference. Application of electrical fields of various amplitude and duration can drive a chiral nematic material into a reflective state, a transmissive state, or an intermediate state. These cholesteric materials have the advantage of maintaining a given state indefinitely after the field is removed. Cholesteric liquid crystal materials can be Merck BL112, BL118 or BL126, available from E.M. Industries of Hawthorne, N.Y.

In the preferred embodiment, the polymeric host material is provided by E.M. Industries cholesteric material BL-118 dispersed in deionized photographic gelatin. The liquid crystal material is dispersed at 8% concentration in a 5% deionized gelatin aqueous solution. The mixture is dispersed to create 10 micron diameter domains of the liquid crystal in aqueous suspension. The material is coated over a patterned ITO polyester sheet to provide a 7 micron thick polymer dispersed cholesteric coating. Other organic binders such as polyvinyl alcohol (PVA) or polyethylene oxide (PEO) can be used. Such compounds are machine coatable on equipment associated with photographic films.

Electrodes in the form of second patterned conductors 40 overlay polymer dispersed cholesteric layer 30. Second patterned conductors 40 should have sufficient conductivity to establish an electric field across polymer dispersed cholesteric layer 30. Second patterned conductors 40 can be formed in a vacuum environment using materials such as aluminum, silver, platinum, carbon, tungsten, molybdenum, tin, or indium or combinations thereof. The second patterned conductors 40 are as shown in the form of a deposited layer. Oxides of said metals can be used to darken second patterned conductors 40. The metal material can be excited by energy from resistance heating, cathodic arc, electron beam, sputtering, or magnetron excitation. Tin-oxide or indium-tin-oxide coatings permit second patterned conductors 40 to be transparent. Electrodes 20 and 40 are on opposite sides of the layer 30 and are in rows and columns, respectively, so that the intersection of a row and column defines pixels for applying an electric field at each intersection across the layer 30 when a voltage is applied to the electrodes.

In a preferred embodiment, second patterned conductors 40 are printed conductive ink such as Electrodag 423SS screen printable electrical conductive material from Acheson Corporation. Such printed materials are finely divided graphite particles in a thermoplastic resin. The second patterned conductors 40 are formed using the printed inks to reduce display cost. The use of a flexible support for substrate 15, laser etching to form first patterned conductors 20, machine coating polymer dispersed cholesteric layer 30 and printing second patterned conductors 40 permits the fabrication of very low cost memory displays. Small displays formed using these methods can be used as electronically rewritable tags for inexpensive, limited rewrite applications.

Figure 2A:
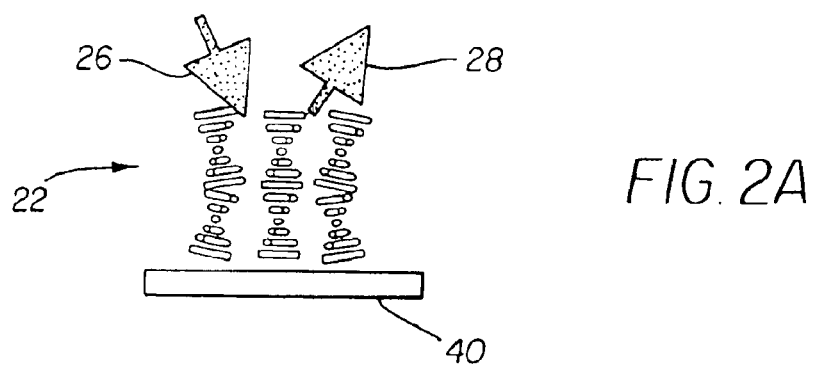
FIG. 2A is a schematic sectional view of a cholesteric liquid crystal material in a planar state reflecting light.
Figure 2B:
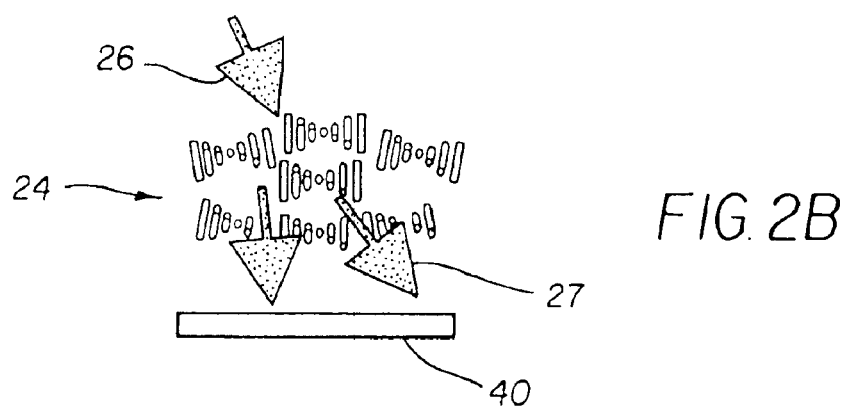
FIG. 2B is a schematic sectional view of a cholesteric liquid crystal material in a focal conic state forward scattering light.
Figure 2C:
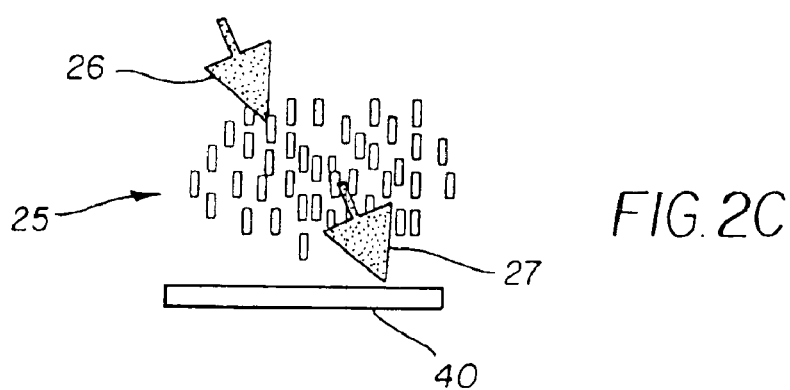
FIG. 2C is a schematic sectional view of a cholesteric liquid crystal material in a homeotropic state transmitting light.

FIG. 2A and FIG. 2B show two stable states of cholesteric liquid crystals. In FIG. 2A, a high voltage field has been applied and quickly switched to zero potential, which converts cholesteric liquid crystal to a planar state 22. Incident light 26 with proper wavelength and polarization striking cholesteric liquid crystal in planar state 22 is reflected as reflected light 28 to create a bright image. In FIG. 2B, application of a lower voltage field leaves cholesteric liquid crystal in a transparent focal conic state 24. Incident light 26 striking a cholesteric liquid crystal in focal conic state 24 is mainly forward scattered. Second patterned conductors 40 can be black which absorbs transmitted light 27 to create a dark image when the liquid crystal material is in focal conic state 24. As a result, a viewer perceives a bright or dark image depending on if the cholesteric material is in planar state 22 or focal conic state 24, respectively. The cholesteric liquid crystal material also has a plurality of reflective states when a part of the cholesteric material is in planar state 22 and the rest is in focal conic state 24. Consequently, a viewer also perceives gray level images. In FIG. 2C, cholesteric liquid crystal is in a homeotropic state 25 when a high voltage is applied. Incident light 26 illuminating a cholesteric liquid crystal in homeotropic state 25 is transmitted.

Figure 2D:
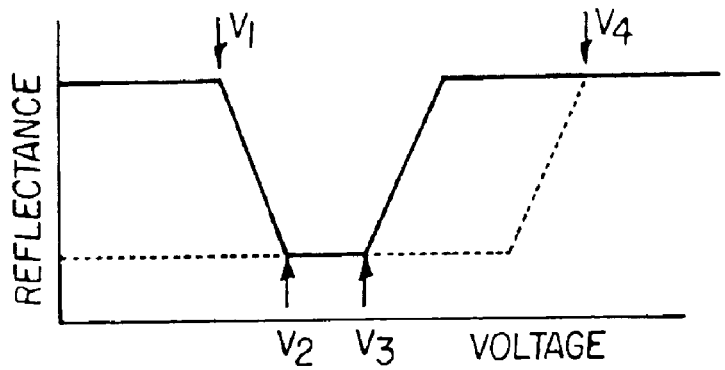
FIG. 2D is a typical plot of the response of reflectance of a cholesteric liquid crystal material to a pulsed voltage (prior art)

FIG. 2D illustrates the state of the liquid crystal material after the application of various driving voltages thereto. This figure generally corresponds to FIG. 1 of U.S. Pat. No. 5,644,330. The liquid crystal material in layer 30 begins in a first state, either the reflecting planar state 22 shown in FIG. 2A or the non-reflecting focal conic state 24 shown in FIG. 2B, and is driven with an AC voltage, having an rms amplitude above V4 in FIG. 2D. When the voltage is removed quickly, the liquid crystal material switches to the reflecting state and will remain reflecting. If driven with an AC voltage between V2 and V3, the material will switch into the non-reflecting state and remain so until the application of a second driving voltage. If no voltage is applied, or the voltage is well below V1, then the material will not change state, regardless of the initial state. It is important to note, however, that the application of voltages below V1 will create optical effects but will not cause a switch in the state of the material.

Figure 3A:
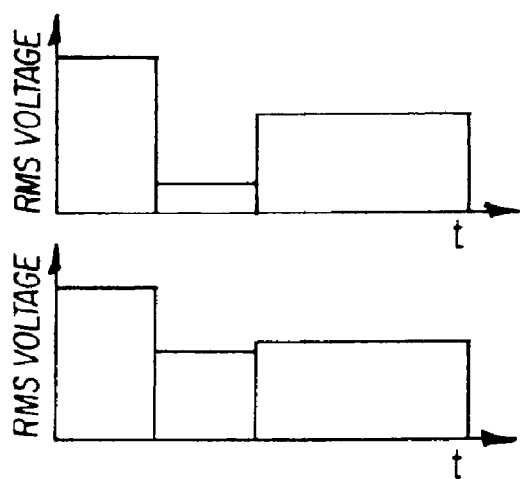
FIG. 3A is 3-step dynamic drive scheme (prior art)
Figure 3B:
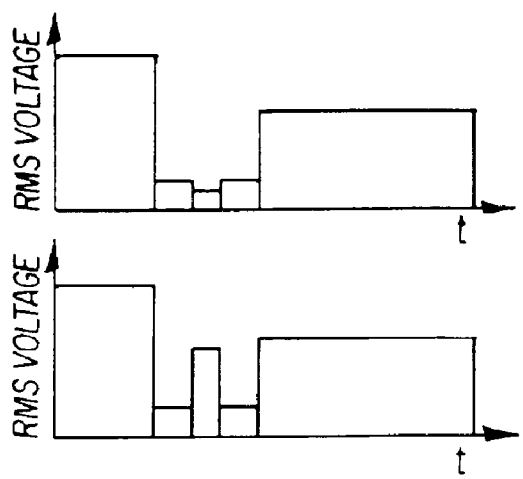
FIG. 3B is 5-step dynamic drive scheme (prior art)

FIG. 3A is a 3-step dynamic drive scheme corresponding to FIGS. 3A and 3B disclosed in U.S. Pat. No. 5,748,277. FIG. 3B is a 5-step dynamic drive scheme and corresponds to FIGS. 19A and 19B disclosed in U.S. Pat. No. 6,154,190. Both drive schemes require multiple voltage levels for the row and column drivers, and are not cost effective. The unipolar drive scheme disclosed in U.S. Pat. No. 6,268,840 also requires multiple voltage levels from row and column drivers.

FIGS. 3C.1, 3C.2 and FIGS. 3D.1 and 3D.2 show prior art $U/\sqrt{3/2}$ and $U/\sqrt{2}$ dynamic driving schemes, respectively, according to Rybalochka et al. (Dynamic Drive Scheme for Fast Addressing of Cholesteric Displays, SID 2000, pp. 818–821; Simple Drive scheme for Bistable Cholesteric LCDs, SID 2001, pp. 882–885). Each of them requires very specific electrooptical property of cholesteric liquid crystal such as $U_{holding}=U_{evolution}=U/\sqrt{2}$, or $U_{holding}=U_{evolution}=U/\sqrt{3/2}$. In addition, each of them provides the same duration in the evolution step for pixels on all rows, consequently, the pixels on different rows see different duration after they are selected, which causes contrast and brightness (brightness will be measured as reflectance at peak reflection wavelength) to change across various rows. Moreover, both prior art $U/\sqrt{2}$ and $U/\sqrt{3/2}$ dynamic driving schemes do not have a holding step for the row written firstly, therefore the row written firstly may suffer from degraded contrast and brightness. Furthermore, they do not teach how to achieve multiple gray levels by using the two voltage levels driving methods.

Circuits and systems for generating pulse trains to drive cholesteric liquid crystal displays are well known. Examples are found in U.S. Pat. Nos. 6,154,190 and 6,268,840 and their entire disclosures are incorporated in the patent application. The reference patents provide row and column drivers that provide pulse trains with different voltage levels to the rows or columns depending upon the step of the display operation. In contrast, the invention uses pulse trains with only 2-levels: U or 0. As such, the invention uses only one voltage source at one voltage and eliminates the multiple voltage sources shown in the referenced patents. In one embodiment a voltage source 100 generates a voltage U.

Figure 4A:
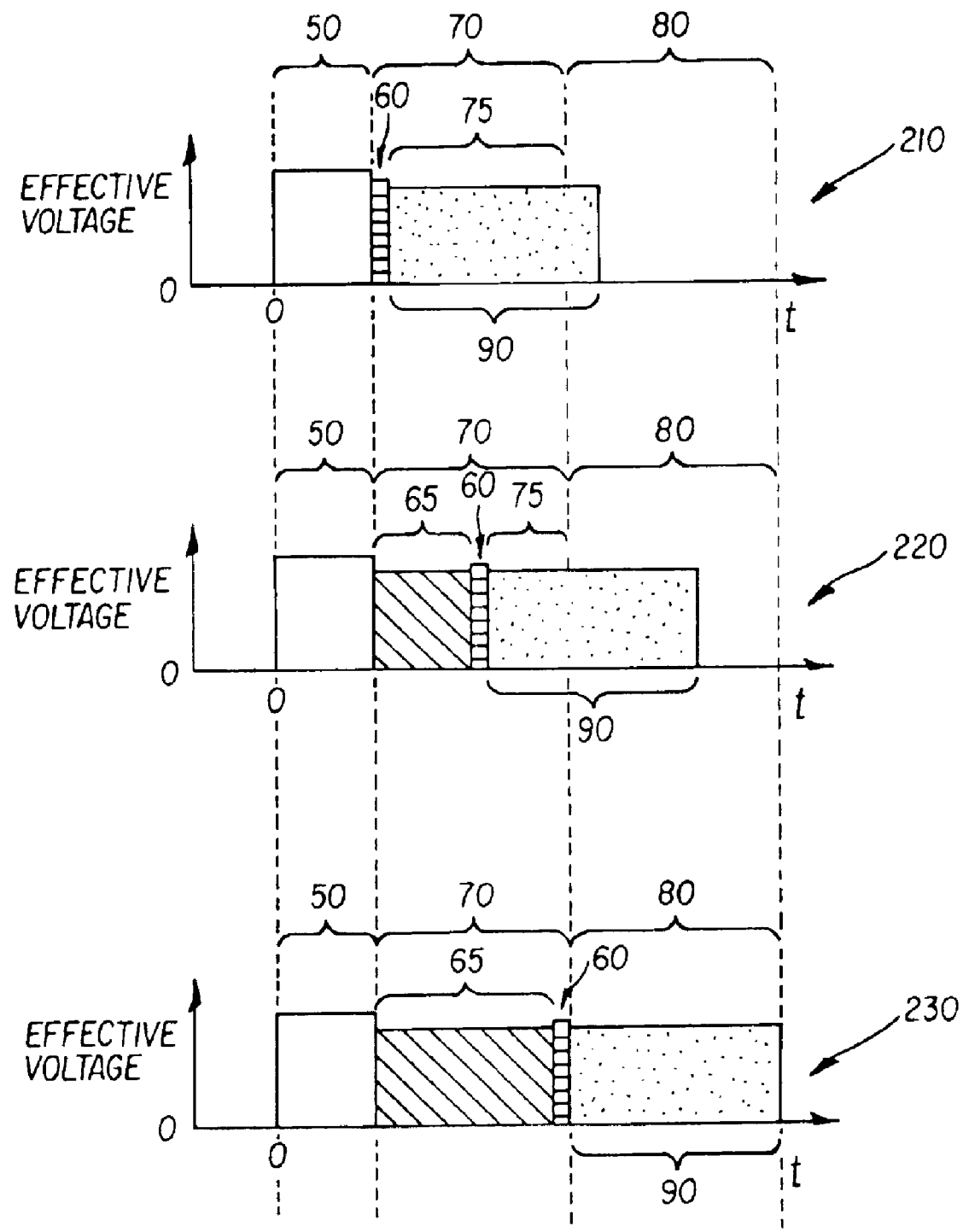
FIG. 4A is a schematic diagram of a drive scheme in accordance with the present invention.
Figure 4B:
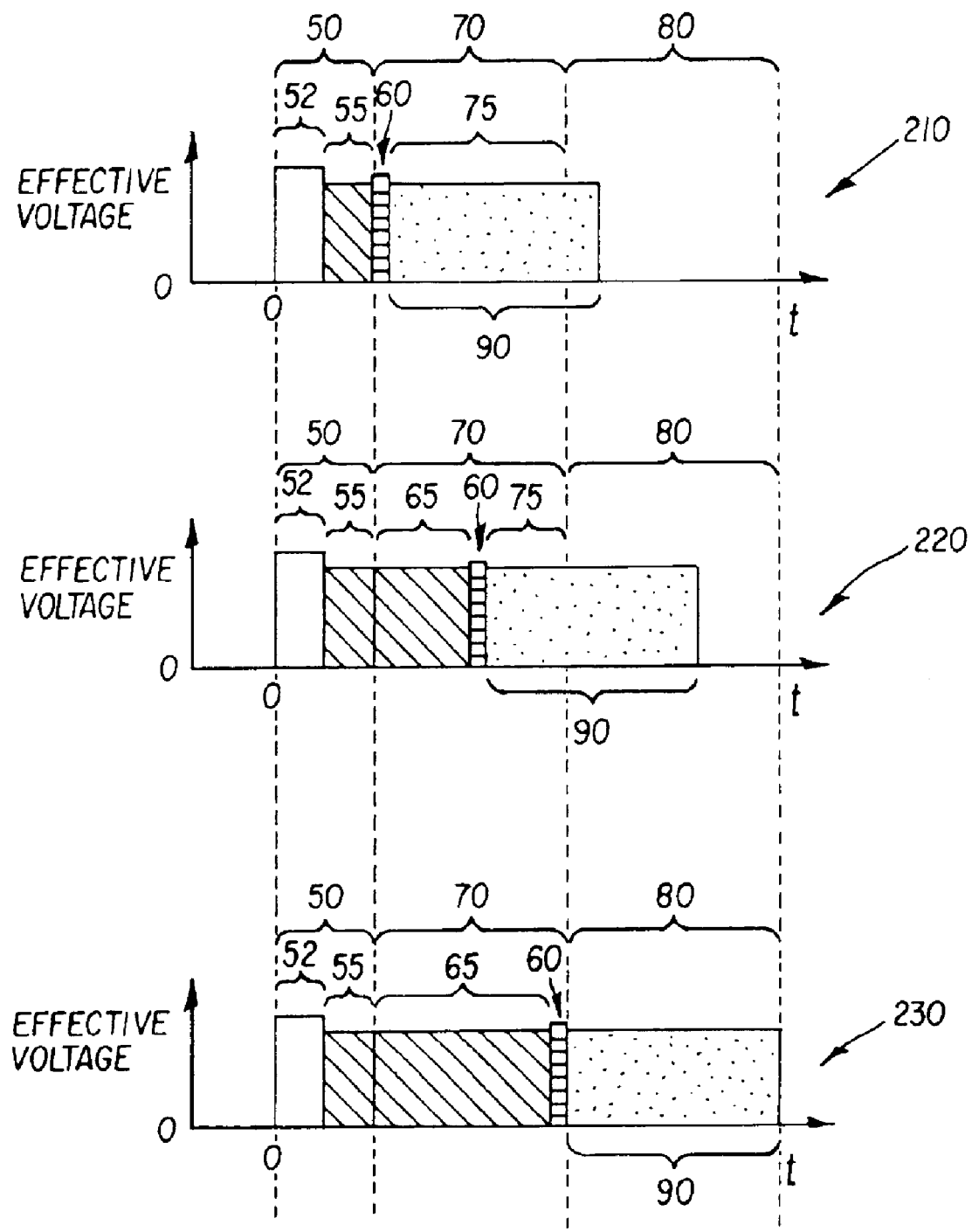
FIG. 4B is another schematic diagram of a drive scheme in accordance with the present invention.
Figure 4C:
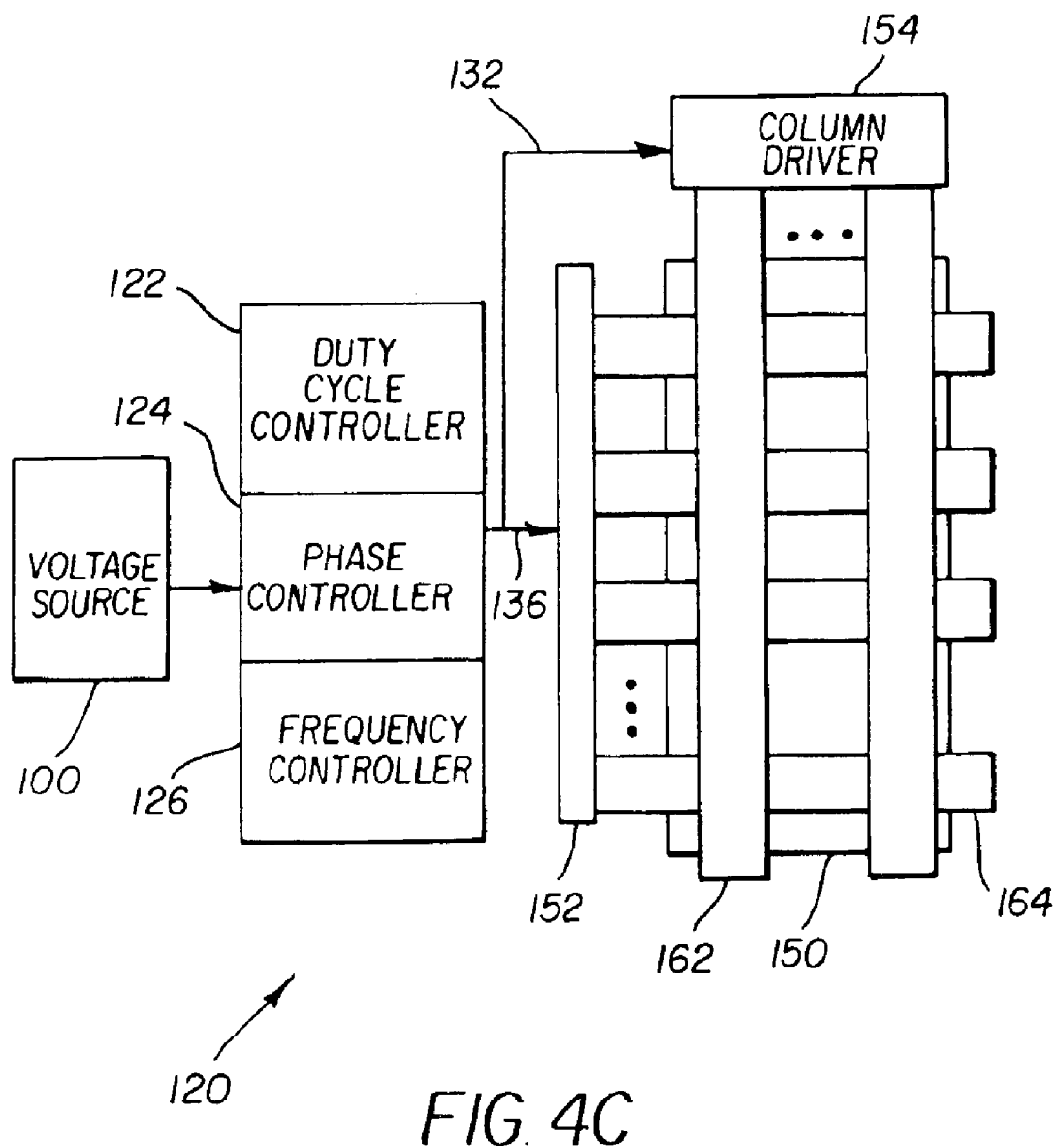
FIG. 4C is a block diagram of an LCD display system and the control electronics for performing the invention.

FIG. 4C shows a display system with control electronics 120 that has a voltage source 100 that generates a voltage at a maximum voltage U. The output voltage U is coupled to a duty cycle controller 122 that generates pulses or voltage signals, a phase controller 124 that sets the relative phase of s train of row output pulses with respect to the column pulse train, and a frequency controller 126 that sets the period of the output pulses. The period may be the same for both sets of pulses or different. The output pulses include column pulses 132 and row pulses 136. The display 150 receives the respective pulses in the column driver 154 and the row driver 152. The drivers apply the pulses to the column electrodes and row electrodes 162, 164 of the display. The individual controllers 122, 124, and 126 may be separated into two sets of controllers, one set for the rows and one set for the columns.

FIG. 4A is a schematic diagram of a drive scheme across pixels of the first row 210, an intermediate row 220, and the last row 230 of the display 150 in accordance with the present invention. The horizontal axis is time t, and the vertical axis is the effective voltage. The invented drive scheme comprises preparation step 50, holding-selection step 70, and evolution step 80. In the preparation step 50, all rows from the first row through the last row experience the same waveform, which has the largest duty cycle in all steps. In holding-selection step 70, image data from column are written to each row at one time, sequentially or non-sequentially, though sequentially writing data is easier to be implemented. For simplicity, a sequentially writing data is assumed to explain the present invention, namely the image data is first written to the first row, and then to the next rows, and finally to the last row. When a row is written to image data, it experiences selection step 60. When it is not written while some row else is being written, it experiences pre-holding step 65 (when this step is before the selection step 60) or post-holding 75 (when this step occurs after the selection step 60). Both pre-holding step and post-holding step have the same duty cycle and period (or frequency). In the invention, the pre-holding step 65, the selection step 60, and the post-holding step 75 of the holding-selection step 70 are not separable. The selection step 60 is formed by the voltage difference between image data from columns and waveform on the row being written, and the pre-holding step 65 and the post-holding step 75 are produced by the voltage difference between image data and waveform on the row not being written. All of the 3-steps share the same image data from columns. Additionally, all rows not being written are subject to a waveform with the same duty cycle. In general, a row sequentially sees the pre-holding step 65, the selection step 60, and the post-holding step 75, except that the row written firstly does not see the pre-holding step 65 and the row written lastly does not experience the post-holding step 75. In the final evolution step 80, the waveform varies by row, however, when combined with the post-holding step 75, it leads to optimized contrast and brightness for each row. A pixel evolution time 90 is chosen to be a combination of the post-holding step 75 and a portion of the evolution step 80. The time 90, however, is substantially constant across all rows. Note that although the effective voltage changes from the preparation step 50 to the holding-selection step 70 and to the evolution step 80 due to changes in duty cycles, the absolute value of voltage amplitude is always either U or 0.

FIG. 4B provides yet another schematic diagram of a drive scheme across pixels of the first row 210, an intermediate row 220, and the last row 230 in accordance with the present invention. It differs from FIG. 4A in that the preparation step 50 also includes a preparation-holding step 55 besides a conventional preparation step 52 which has the maximum duty cycle as the preparation phase 50 in FIG. 4A. The preparation-holding step 55 may be unchanged across all rows such as shown in FIG. 4B. The preparation-holding step 55 may also vary across all rows, and is preferred to be longer for the rows firstly written than for the ones written lastly. When the preparation-holding step 55 varies by rows, it may not exist on the rows written lastly. The preparation-holding step 55 boosts the contrast and brightness for the first few written rows, especially for the row being written firstly. Although in a preferred embodiment, the preparation-holding step 55 has the same duty cycle and period (or frequency) as the pre-holding 65 and post-holding 75 steps, it differs from them, because during the preparation-holding step 55 there are no image data to be written. Therefore, the preparation-holding step 55 is separable from the selection step 60 and can be adjusted to further improve contrast and brightness on a row basis. It should be understood that the preparation-holding step 55 may have a different duty cycle and/or period (or frequency) than the pre-holding 65 and post-holding 75 steps.

Figure 5A:
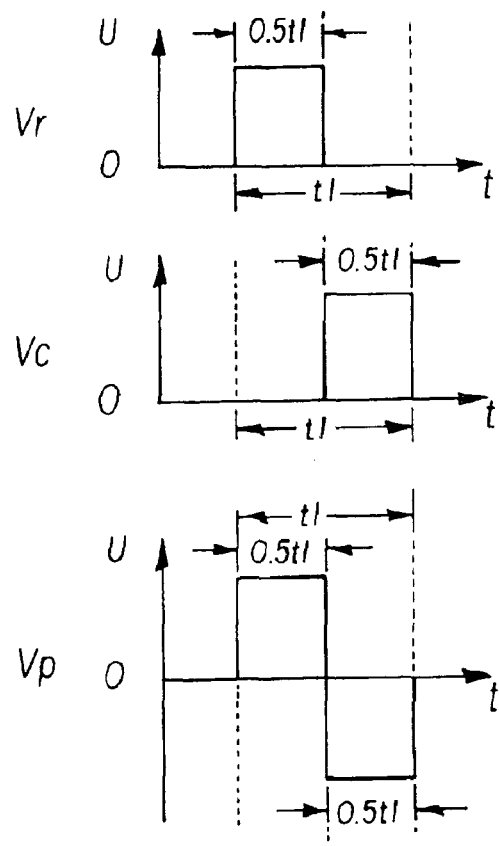
FIG. 5A and FIG. 5B are schematic diagrams of the preparation step in accordance with the present invention.
Figure 5B:
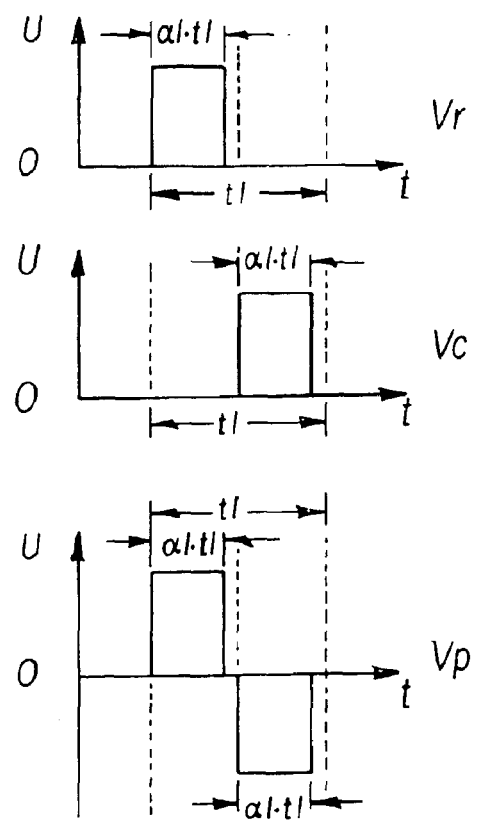

FIG. 5A and FIG. 5B show schematic diagrams of the preparation step in accordance with the present invention. Both figures provide only a repetitive unit of waveform, as is true of FIG. 6A through FIG. 7G. In FIG. 5A both row and column voltage pulses $V_r$ and $V_c$, respectively, have a period of t1 (or a frequency of 1/t1) and a duty cycle of approximately 50%, and preferably equal to 50%. The amplitudes of $V_r$ and $V_c$ are either the maximum voltage U or the minimum voltage 0. The column voltage $V_c$ is out of phase relative to the row voltage $V_r$. Consequently, the voltage across the pixel $V_p$, which is given by $V_p=V_r-V_c$, has a duty cycle substantially equal to 100%. FIG. 5B illustrates that both row and column voltage pulses $V_r$ and $V_c$ applied have a duty cycle equal to $\alpha 1$ ($0 \leq \alpha 1 \leq 50\%$), and the voltage across the pixel $V_p$ (or pixel voltage) then has a duty cycle of $2\alpha 1$ ($0 \leq 2\alpha 1 \leq 100\%$). Therefore, adjusting the relative phase of the row and column voltage pulses provides a bipolar field with a duty cycle varying from 0% to 100% across the cholesteric material. The bipolar field is preferred to have a duty cycle varying from 90% to 100% so that it is sufficient to produce a field that cause the cholesteric material to be in a homeotropic state. During the preparation step 52, all rows have the same timing, and all columns have the same timing but are out of phase with row voltages. The pixel voltage $V_p$ is described by three parameters: duty cycle $dc1=2\alpha 1$ ($0 \leq \alpha 1 \leq 0.5$), period t1, and number of cycle (repetitive unit) N1 in this step. The effective voltage across every pixel is $U\sqrt{2\alpha 1}$. N1 is sufficiently large so that this step can switch the cholesteric liquid crystal into a homeotropic state 25. For a typical period t1=1 ms, N1 is around 10 to 50. The duty cycle dc1 is preferred to be greater than 90%, and most preferably to be equal to 100%. The preparation-holding step 55 can be implemented by a variety of ways, among which is to take a proper duty cycle dc1, period t1, and number of cycles N1 according to FIG. 5B.

Figure 6A:
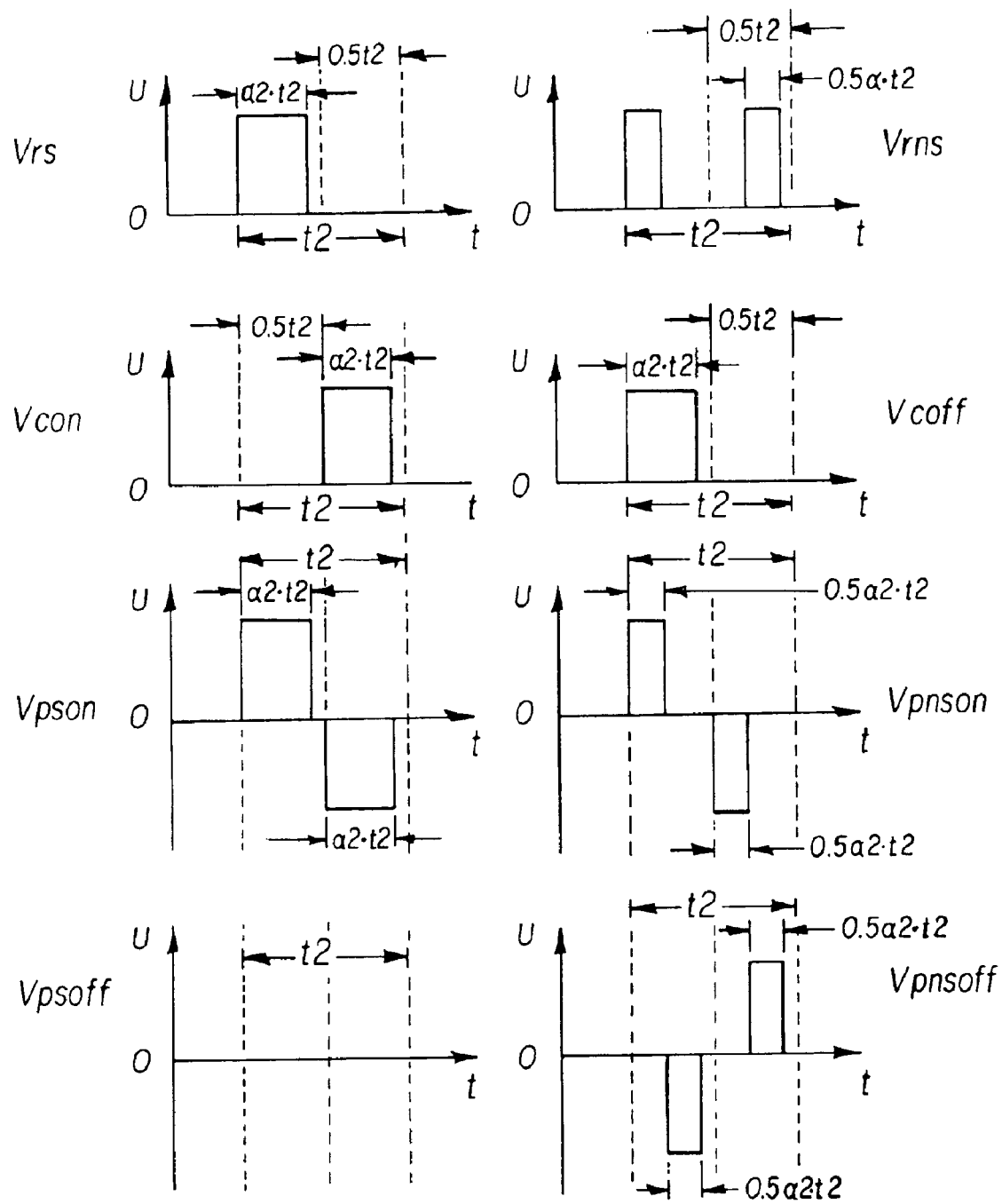
FIG. 6A is a schematic diagram of the first example of holding-selection step in accordance with the present invention.
Figure 6B:
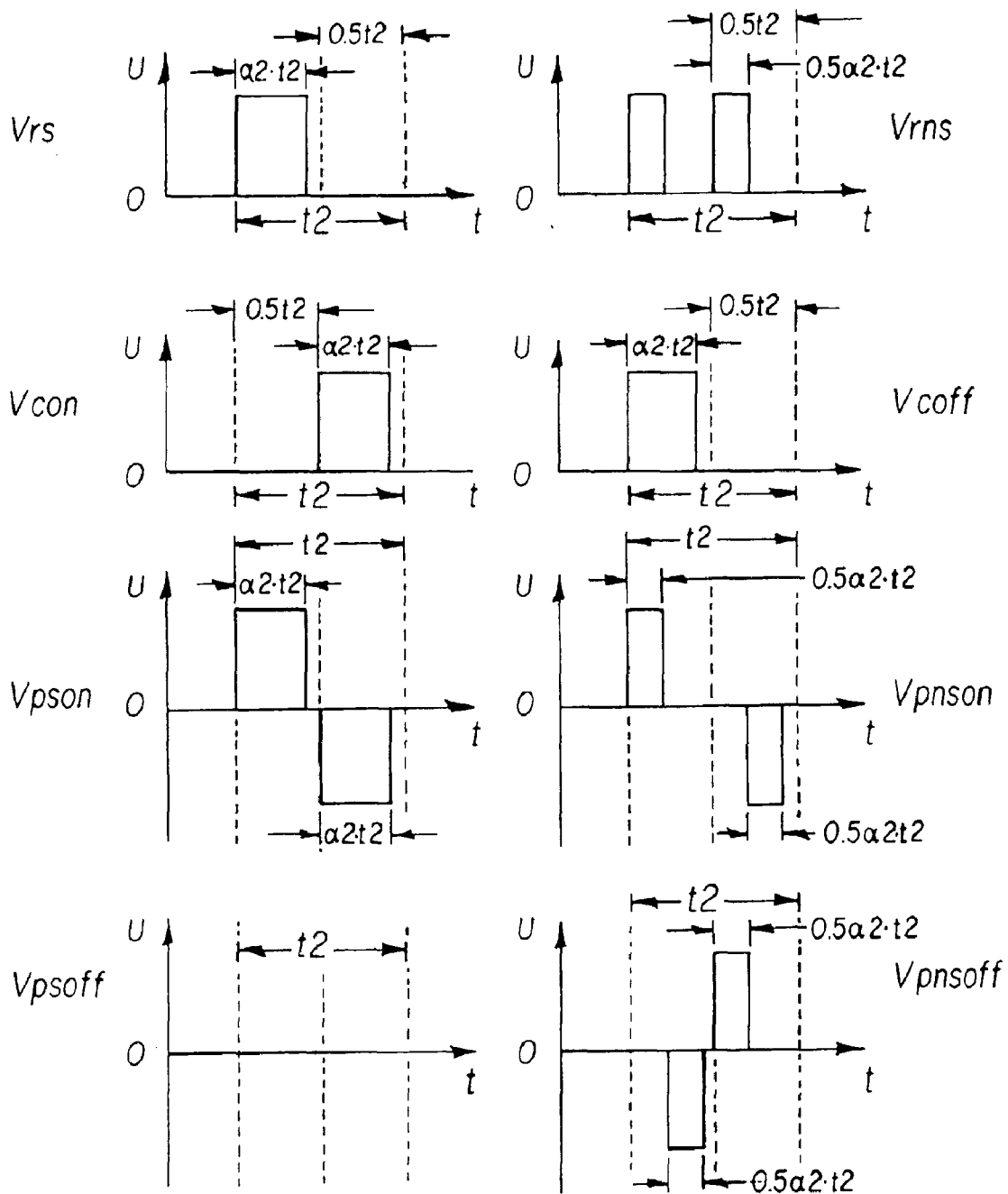
FIG. 6B is a schematic diagram of the second example of holding-selection step in accordance with the present invention.
Figure 6C:
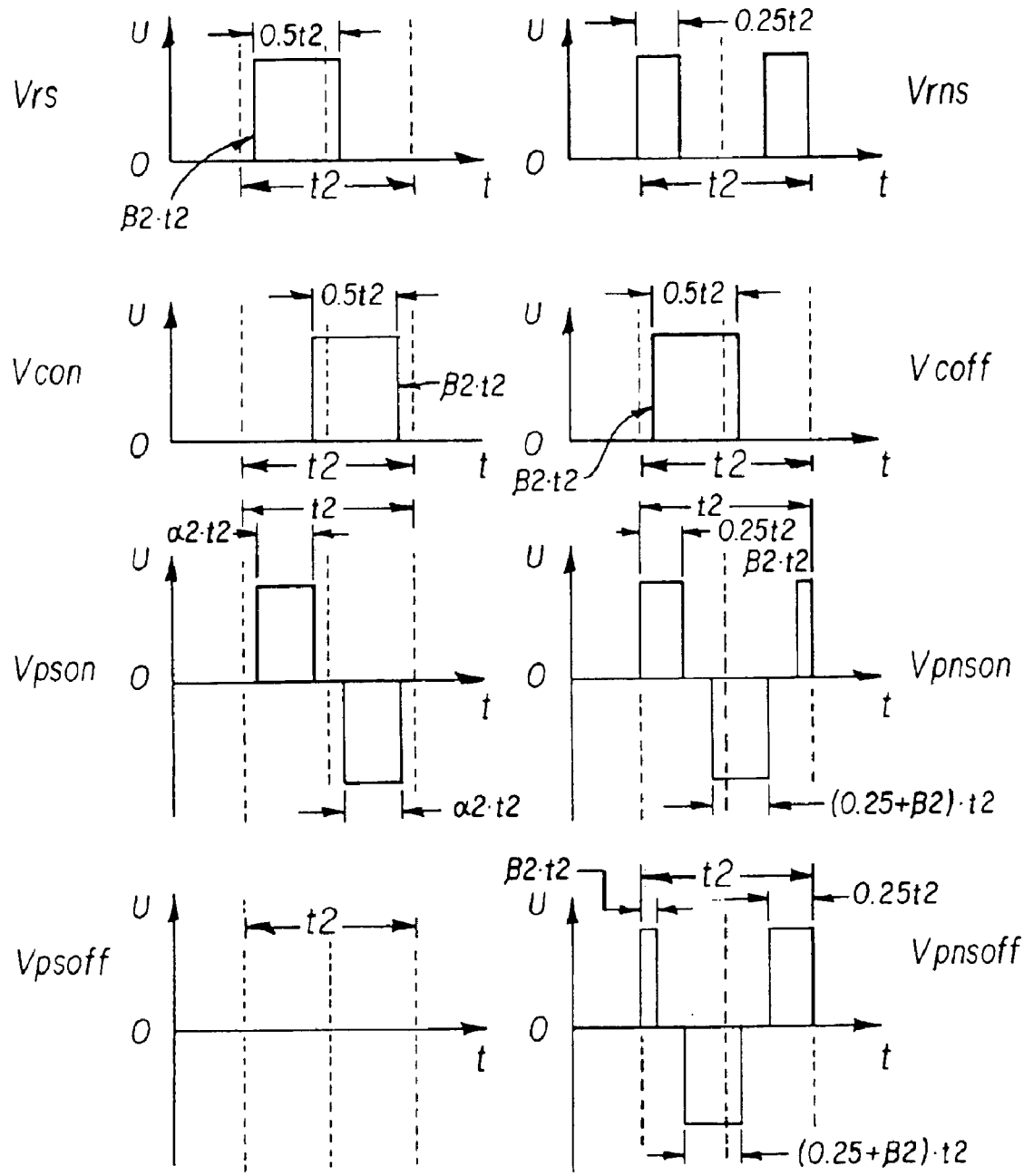
FIG. 6C is a schematic diagram of the third example of holding-selection step in accordance with the present invention.

FIGS. 6A, 6B, and 6C show the schematic diagram of various embodiments of holding-selection step 70. It includes a pre-holding step 65, selection step 60, and post-holding step 75. However, unlike the preparation-holding step 55 described above in FIGS. 5A and 5B and the evolution step 80 discussed below in FIGS. 7A, 7B, 7C, 7D, 7E, 7F and 7G, these 3-steps are not separable and are related to the number of rows designated as Nrow. During these steps, the image data are written row by row. For a selected row being written, the row voltage is $V_{rs}$. For non-selected rows, the row voltage is $V_{rns}$. The column voltage is either $V_{con}$ for on-state or $V_{coff}$ for off-state. All these row and column voltage pulses applied have the same maximum voltage U and the same minimum voltage 0. The selected on-state and off-state pixels see pixel voltages $V_{pson}$ and $V_{psoff}$, respectively. The non-selected pixels see pixel voltage $V_{pnson}$ when the column voltage is $V_{con}$, and see voltage $V_{pnsoff}$ when the column voltage is $V_{coff}$. For the i-th row, there are (i–1) cycles of pre-holding step 65, followed by selection step 60, and then followed by (Nrow-i) cycles of post-holding step 75. Consequently, there is no pre-holding step 65 for the row written firstly and no post-holding step 75 for the row written lastly. All the waveforms are described in FIGS. 6A, 6B, and 6C, with a period of t2. In FIG. 6A, row voltages $V_{rs}$ for selected rows and $V_{rns}$ for non-selected rows, and column voltages $V_{con}$ for on-state and $V_{coff}$ for off-state all have a duty cycle of α2 (0≦α2≦50%). The pixel voltages $V_{pson}$, $V_{psoff}$, $V_{pnson}$, and $V_{pnsoff}$ have duty cycles of 2α2, 0, α2, and α2, respectively, (0≦α2≦50%). FIG. 6B shows a modified version of FIG. 6A, in which the selected row voltage $V_{rs}$, the on-state column voltage $V_{con}$, and off-state column voltage $V_{coff}$ are the same as those in FIG. 6A. However, the row voltage for non-selected rows $V_{rns}$ in FIG. 6B has a different timing or phase than its counter part in FIG. 6A, which in turn results in a different timing for pixel voltages $V_{pnson}$ and $V_{pnsoff}$. Nevertheless, the pixel voltages $V_{pson}$, $V_{psoff}$, $V_{pnson}$, and $V_{pnsoff}$ in FIG. 6B have duty cycles of 2α2, 0, α2, and α2, respectively, (0≦α2≦50%), just the same as those in FIG. 6A. FIG. 6C provides another example of holding-selection step, in which row voltages $V_{rs}$ (on selected rows) and $V_{rns}$ (on non-selected rows), and column voltages $V_{con}$ (for on-state) and $V_{coff}$ (for off-state) all have a duty cycle of 50% but have different phases in time. As a result, the pixel voltages for selected rows $V_{pson}$ and $V_{psoff}$ keep the same duty cycles 2α2 (0≦α2≦50%) and 0, respectively, as those in FIGS. 6A and 6B. However, the pixel voltages for non-selected rows $V_{pnson}$ and $V_{pnsoff}$ have a duty cycle of 2α2 (0≦α2≦50%) as opposed to α2 (0≦α2≦50%) in FIGS. 6A and 6B. The phase between the start of the voltage U relative to the beginning of the cycle for $V_{rs}$ is described by the variable called as phase factor β2, which varies between 0 and 25%, and is related to α2 by α2=0.5−2β2. When the phase factor β2 equals 0, the duty cycle of $V_{pnson}$ and $V_{pnsoff}$ is 50%, and the effective voltages of $V_{pson}$, $V_{psoff}$, $V_{pnson}$, and $V_{pnsoff}$ are equal to U, 0, $\sqrt{1/2}U$, and $\sqrt{1/2}U$, respectively. When β2=1/12, the voltages of $V_{pson}$, $V_{psoff}$, $V_{pnson}$, and $V_{pnsoff}$ are equal to $\sqrt{2/3}U$, 0, $\sqrt{2/3}U$, and $\sqrt{2/3}U$, respectively. By varying α2 or β2 in FIGS. 6A, 6B, and 6C, the pixel voltages $V_{pson}$, $V_{pnson}$, and $V_{pnsoff}$ can vary from 0 to U and are related by the formulas:

$$\overline{V_{pson}} = \sqrt{2} \cdot \overline{V_{pnson}} = \sqrt{2} \cdot \overline{V_{pnsoff}} \text{ when } 0 \leq \overline{V_{pnson}} = \overline{V_{pnsoff}} \leq 1/\sqrt{2}\,U,$$

and $$\overline{V_{pson}} = \sqrt{2} \cdot \sqrt{1 - \overline{V_{pnson}}^2} = \sqrt{2} \cdot \sqrt{1 - \overline{V_{pnsoff}}^2}$$

when $U/\sqrt{2} \leq \overline{V_{pnson}} = \overline{V_{pnsoff}} \leq U$, where $\overline{V_{pson}}$, $\overline{V_{pnson}}$, and $\overline{V_{pnsoff}}$ are the effective voltages (root mean square voltages) of $V_{pson}$, $V_{pnson}$, and $V_{pnsoff}$, respectively. This flexibility allows enhanced contrast ratio and brightness achieved simultaneously for a variety of cholesteric liquid crystal displays in contrast to prior art driving schemes with fixed phase factors. The pixel voltage $V_{psoff}$ is preferred to be constant as 0 so that a good off-state (typically a black state) can be achieved.

Figure 6D:
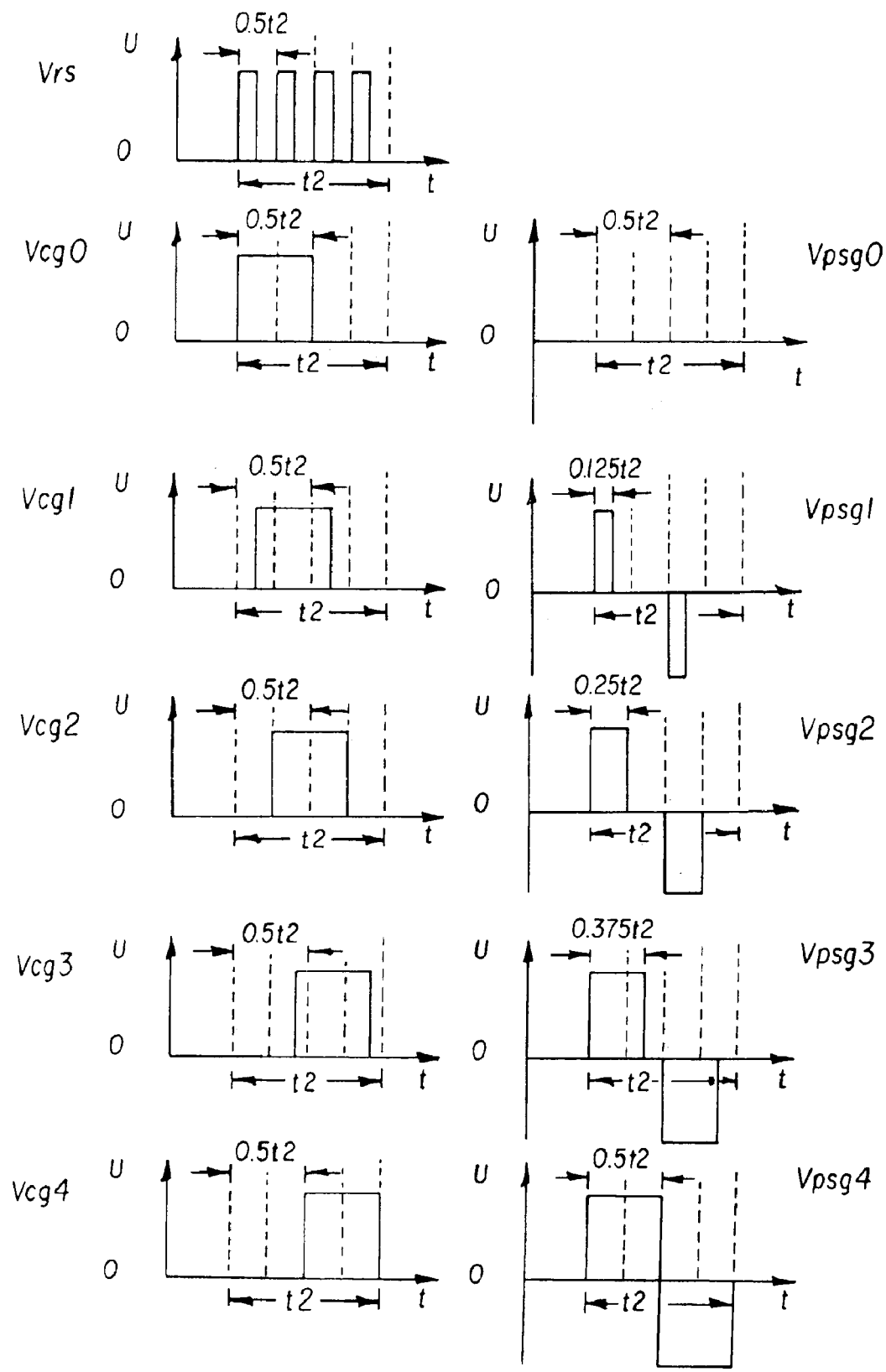
FIG. 6D is a schematic diagram of holding-selection step to achieve gray levels for pixels on selected rows in accordance with the present invention.
Figure 6E:
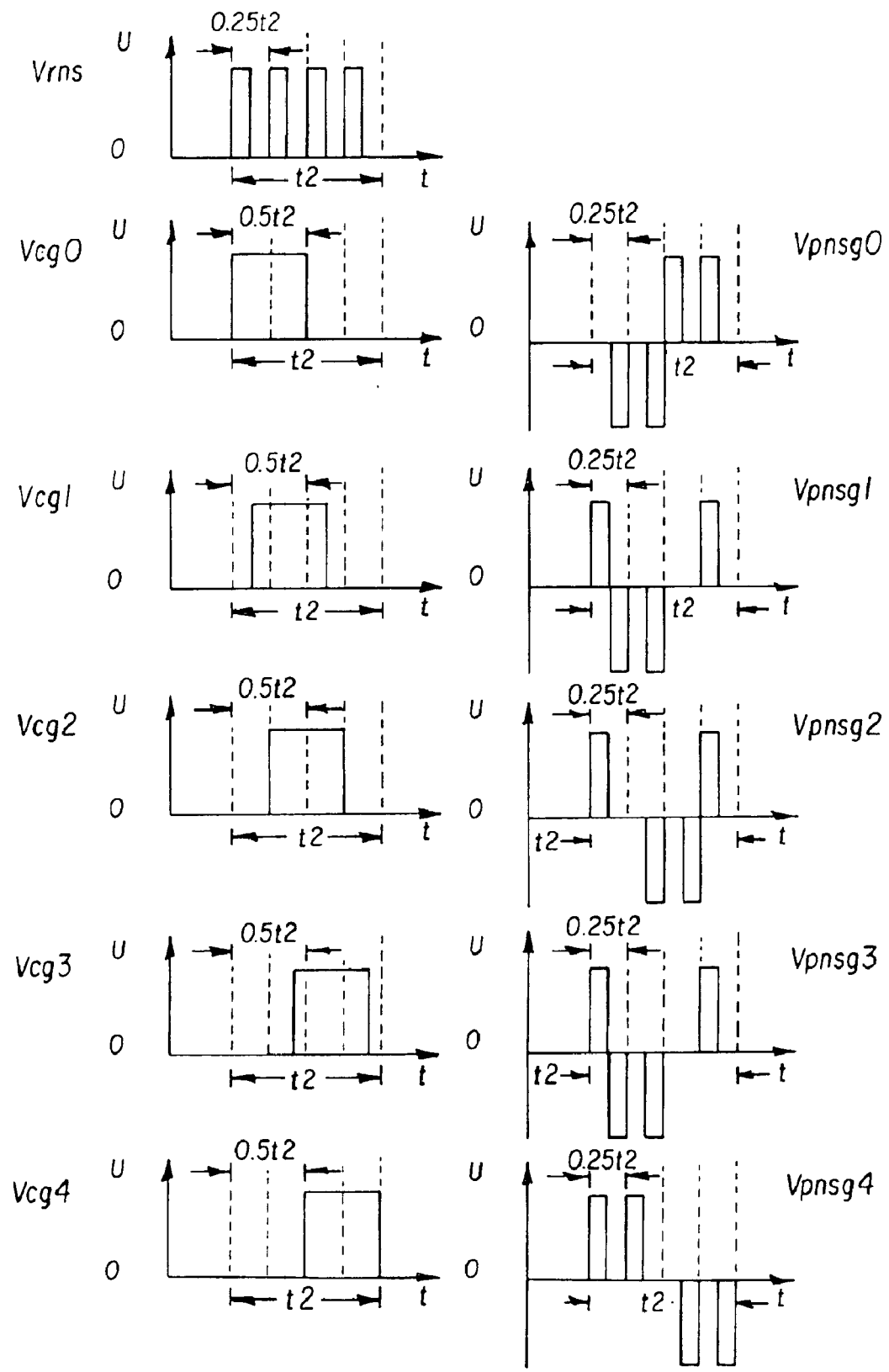
FIG. 6E is a schematic diagram of holding-selection step to achieve gray levels for pixels on non-selected rows in accordance with the present invention.

FIG. 6D and FIG. 6E show one example of waveform to achieve five gray levels by using two voltage levels row and column drivers. For simplicity of illustration, the duty cycle of row and column voltages has been chosen as 50%. Row voltage pulses $V_{rs}$ for selected rows and $V_{rns}$ for non-selected rows have different frequencies but have the same total duty cycle in the period t2. Now the column voltage takes one of the five waveforms as described by $V_{cg0}$, $V_{cg1}$, $V_{cg2}$, $V_{cg3}$, and $V_{cg4}$, all of which have 2-levels (U or 0), the same duty cycle of 50% and period of t2 as $V_{rs}$ and $V_{rns}$, in contrast that the column voltage takes only one of two waveforms ($V_{con}$ for on-state, and $V_{coff}$ for off-state) as in FIGS. 6A, 6B, and 6C, as well as in all prior arts using 2 voltage level driving. Consequently, when the column voltages are $V_{cg0}$, $V_{cg1}$, $V_{cg2}$, $V_{cg3}$, and $V_{cg4}$, respectively, the resulting voltages across pixels on selected rows are $V_{psg0}$ (0% duty cycle), $V_{psg1}$ (25% duty cycle), $V_{psg2}$ (50% duty cycle), $V_{psg3}$ (75% duty cycle), and $V_{psg4}$ (100% duty cycle), respectively. Therefore, 5 gray levels $V_{psg0}$, $V_{psg1}$, $V_{psg2}$, $V_{psg3}$, and $V_{psg4}$ are provided to selected rows. In the meantime, the resulting voltages across pixels on non-selected rows are $V_{pnsg0}$, $V_{pnsg1}$, $V_{pnsg2}$, $V_{pnsg3}$, and $V_{pnsg4}$, respectively, all having a 50% duty cycle as expected. For those skilled in the art, the above gray level driving scheme can be readily extended to less or more levels such as 3, 4, 8, 16, 32, or any other number of levels. In conjunction with the variable duty cycles other than 50% as disclosed in FIGS. 6A, 6B, and 6C, the above gray level driving scheme can also be easily extended to a variable duty cycle for the holding-selection phase, thus allowing further optimization for each gray levels. Within the scope of invention, one can design other waveforms for gray levels by modifying the relative phase of row and column voltage pulses, in a manner similar to that shown in FIGS. 6A, 6B, and 6C. It should be noted that a plurality of gray level states meeting requirements can always be selected. In addition, higher duty cycle may not necessarily lead to higher reflectance. Therefore, the scheme according to FIGS. 6D and 6E actually provides another optimization method for two levels (ON and OFF) writing. It allows duty cycle of selected on-state pixel voltages $V_{pson}$ (replaced with gray level voltages) to vary from 0% to 100% and keeps duty cycle of non-selected pixel voltage $V_{pnson}$ or $V_{pnsoff}$ fixed, for example, at 50%. This means that duty cycle of selected on-state pixel voltage $V_{pson}$ can be varied independently of duty cycle of non-selected pixel voltage $V_{pnson}$ or $V_{pnsoff}$. As a comparison, according to FIGS. 6A, 6B, and 6C, although the duty cycle of pixel voltages $V_{pson}$, $V_{pnson}$, and $V_{pnsoff}$ can vary from 0% to 100%, they cannot be varied independently and are related by the formulas: $DC_{pson}=2 \cdot DC_{pnson}=2 \cdot DC_{pnsoff}$ when $0\% \leq DC_{pnson}=DC_{pnsoff} \leq 50\%$, and $DC_{pson}=2 \cdot (1-DC_{pnson})=2 \cdot (1-DC_{pnsoff})$ when $50\% \leq DC_{pnson}=DC_{pnsoff} \leq 100\%$, where $DC_{pson}$, $DC_{pnson}$, and $DC_{pnsoff}$ are the duty cycles of $V_{pson}$, $V_{pnson}$, and $V_{pnsoff}$, respectively. It should be understood that this example does not exhaust all possible waveforms for each case.

Figure 7A:
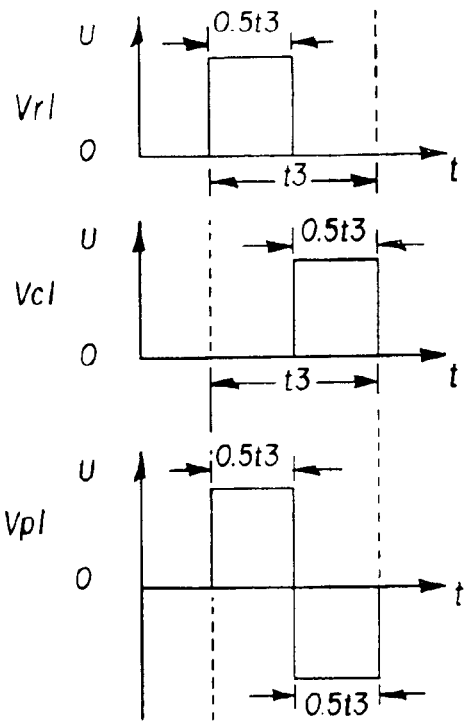
FIGS. 7A, 7B, 7C, 7D, 7E, 7F, and 7G are schematic diagrams of various examples of the evolution step in accordance with the present invention.
Figure 7B:
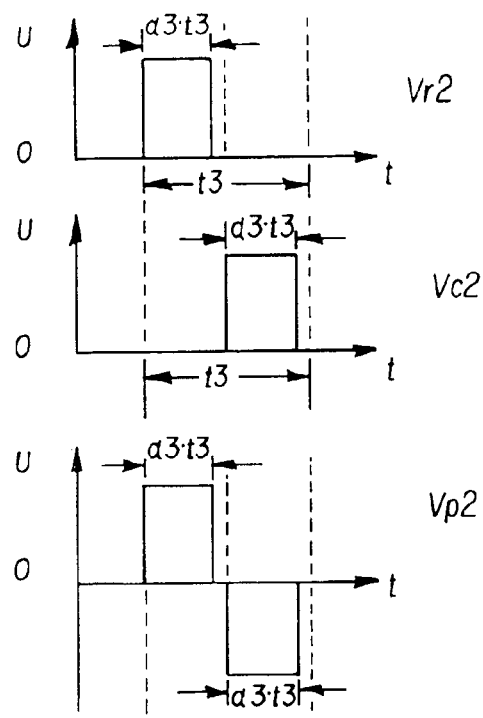
Figure 7C:
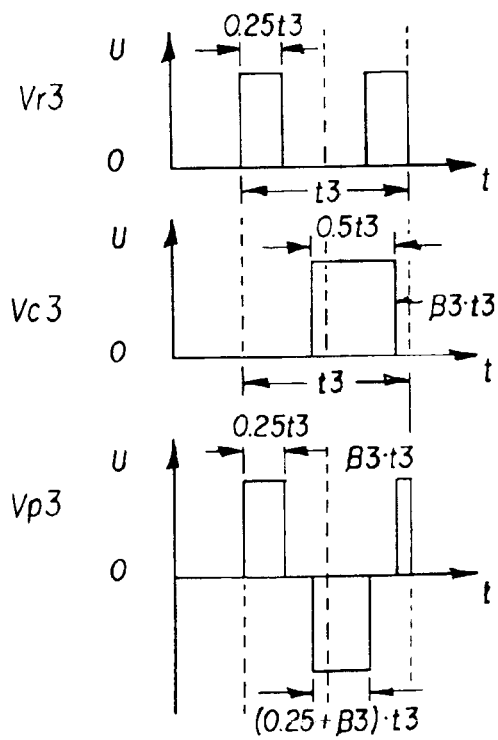
Figure 7D:
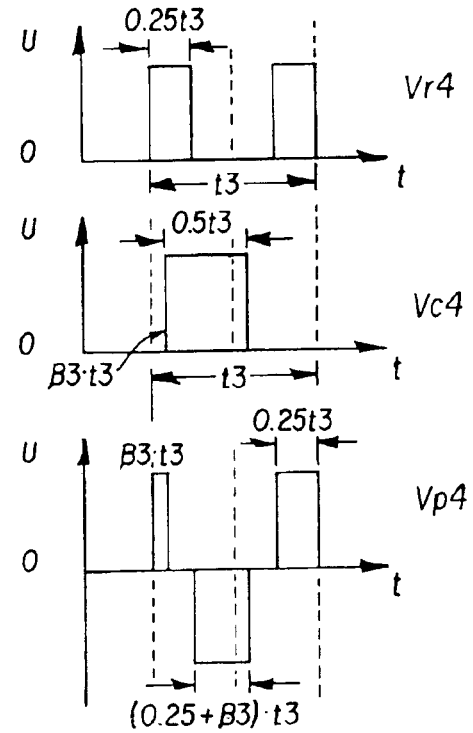
Figure 7E:
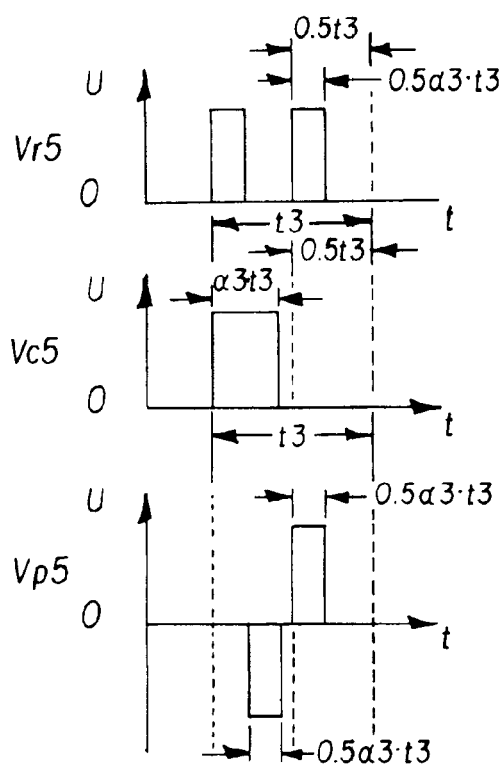
Figure 7F:
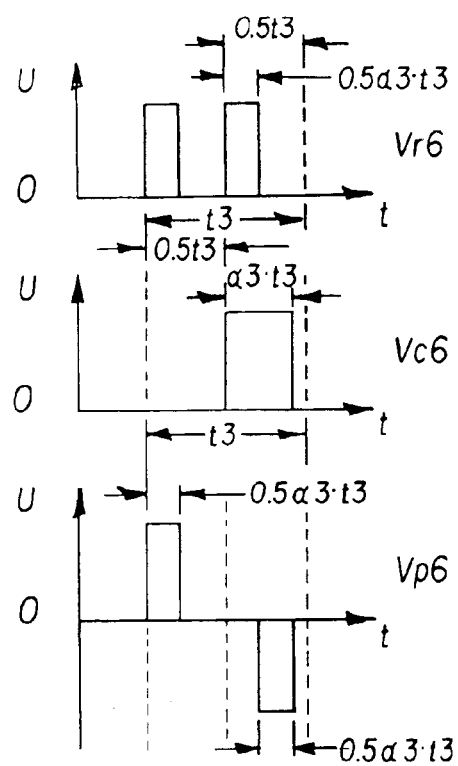
Figure 7G:
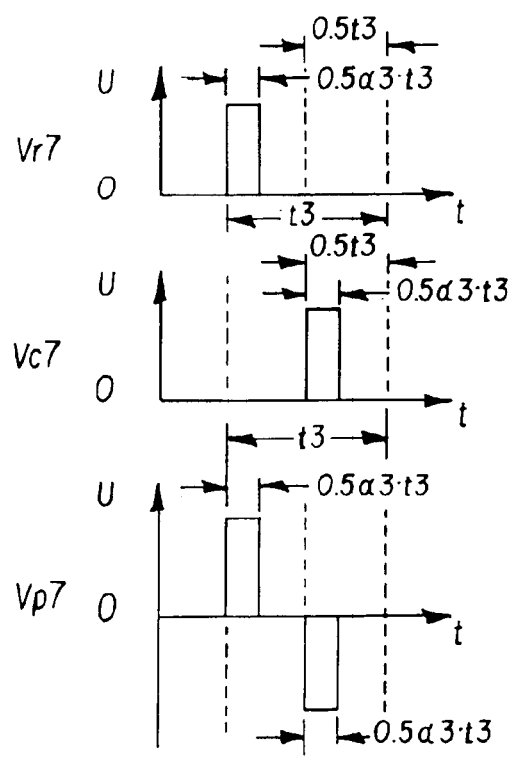

For evolution step 80, some examples of the waveforms are described in FIGS. 7A, 7B, 7C, 7D, 7E, 7F, and 7G. In each figure, there are provided a row voltage $V_{ri}$, a column voltage $V_{ci}$, and a corresponding pixel voltage $V_{pi}$, where i=1, 2, . . . , 7, referring to different examples. All row and column voltage pulses applied have the same maximum voltage U and the minimum voltage 0 with substantially the same duty cycle and with different relative phases to cause the pixels to evolve to a written reflective state. The period of this step is t3. Like the pixel voltage $V_p$ in FIG. 5A, FIG. 7A shows that the pixel voltage $V_{p1}$ has a duty cycle of 100%. FIG. 7B is the counterpart of FIG. 5B, in which the pixel voltage $V_{p2}$ has a duty cycle of $2\alpha3$ ($0 \leq \alpha3 \leq 50\%$). Voltages $V_{r3}$, $V_{c3}$ and $V_{p3}$ in FIG. 7C are the same as $V_{rns}$, $V_{con}$, and $V_{pnson}$ shown in FIG. 6C, respectively. Voltages $V_{r4}$, $V_{c4}$ and $V_{p4}$ in FIG. 7D are the same as $V_{rns}$, $V_{coff}$, and $V_{pnsoff}$ shown in FIG. 6C, respectively. Voltages $V_{r5}$, $V_{c5}$ and $V_{p5}$ in FIG. 7E are the same as $V_{rns}$, $V_{coff}$, and $V_{pnsoff}$ shown in FIG. 6B, respectively. Voltages $V_{r6}$, $V_{c6}$ and $V_{p6}$ in FIG. 7F are the same as $V_{rns}$, $V_{con}$, and $V_{pnson}$ shown in FIG. 6B, respectively. In FIG. 7G both row and column voltage pulses $V_{r7}$ and $V_{c7}$ have a duty cycle of $0.5\alpha3$ ($0 \leq \alpha3 \leq 50\%$), and the pixel voltage $V_{p7}$ has a duty cycle of $\alpha3$. The pixel voltage $V_{pi}$ (i=1, ... 7) in evolution step is described by duty cycle dc3=$2\alpha3$ ($0 \leq \alpha3 \leq 50\%$), period t3, and number of cycle N3. The root mean square voltage across every pixel is $\sqrt{2\alpha3}U$. Compared to the duty cycle of pixel voltage dc1 in the preparation step, the duty cycle of pixel voltage dc3 in evolution step is generally less than 1 and dc1, and dc1 is preferred to be equal to 1. Both t3 and N3 are generally not equal to their counterparts t1 and N1. The parameters dc3, t3, and N3 are chosen such that the selected on-pixel will change to reflective state, and the selected off-pixel will change to focal conic state. If dc3, t3, and N3 are too small compared to optimized parameters, the selected off-pixel will transform to undesired reflective state. On the other hand, if dc3, t3, and N3 are too large compared to optimized parameters, the selected on-pixel will transform to undesired focal conic state.

Figure 8B:
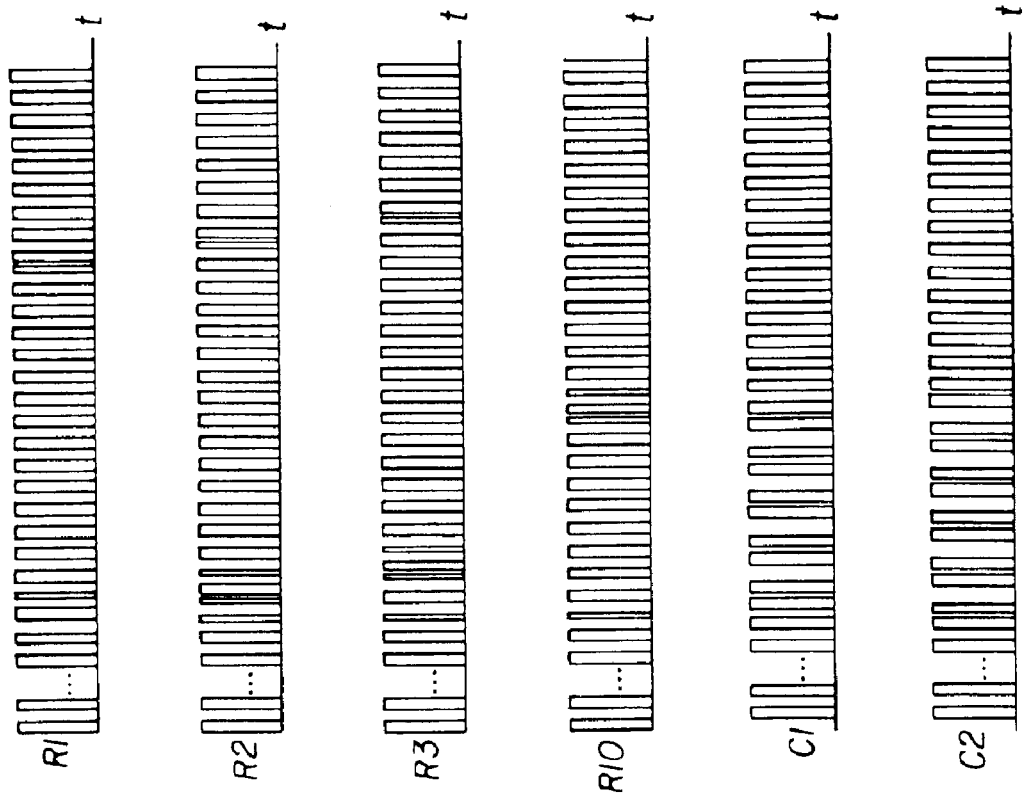
FIGS. 8A–8D show a matrix of ten rows and two columns and the pulse trains applied to column 1 and column 2.
Figure 8A:
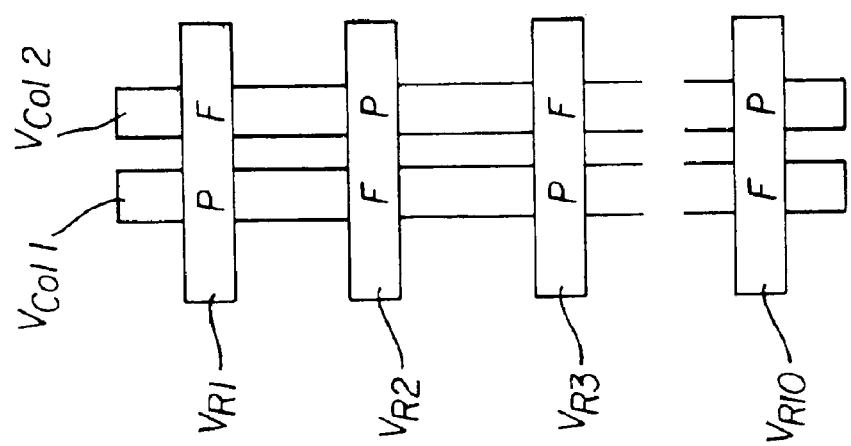
Figure 8C:
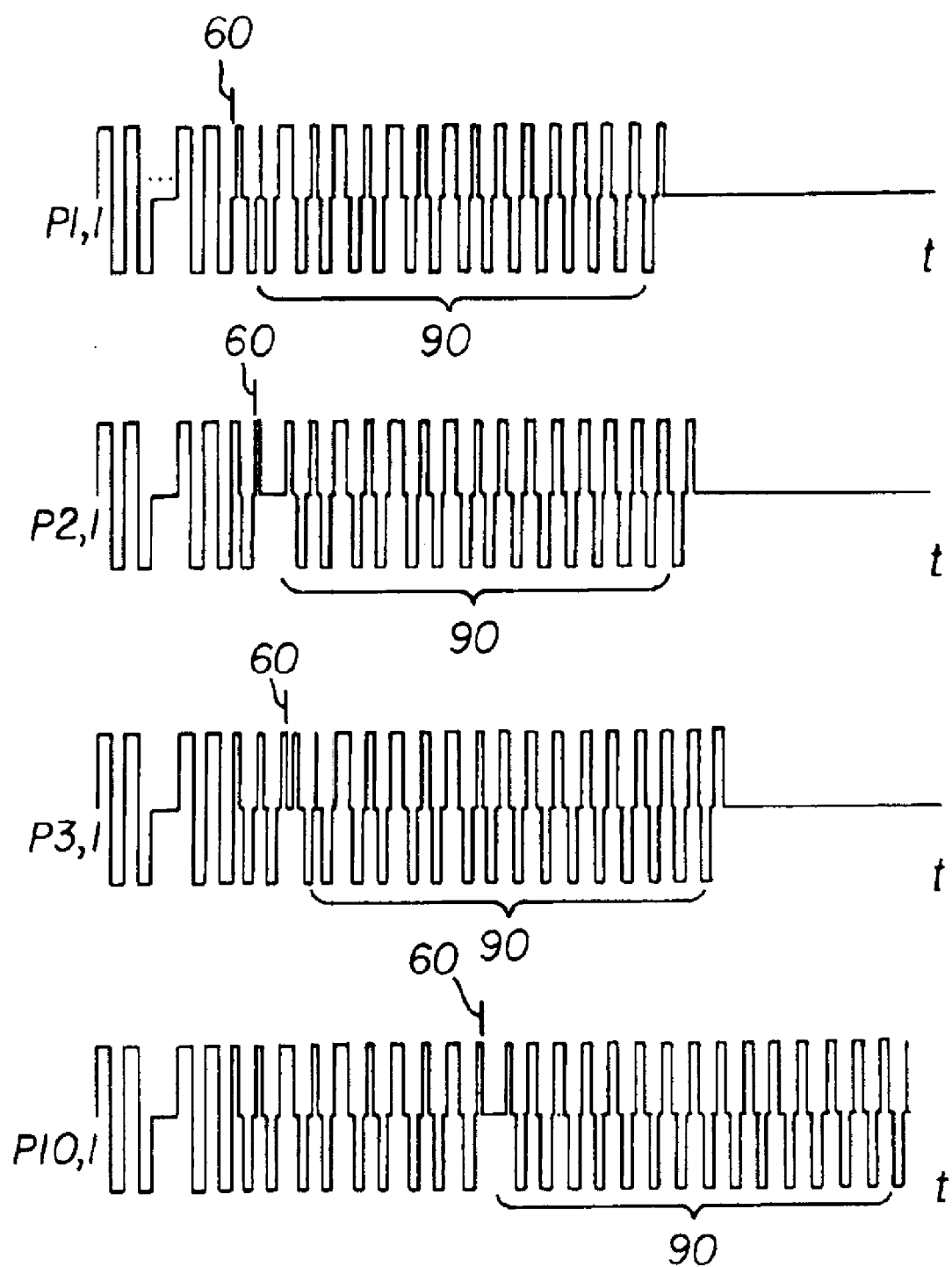
Figure 8D:
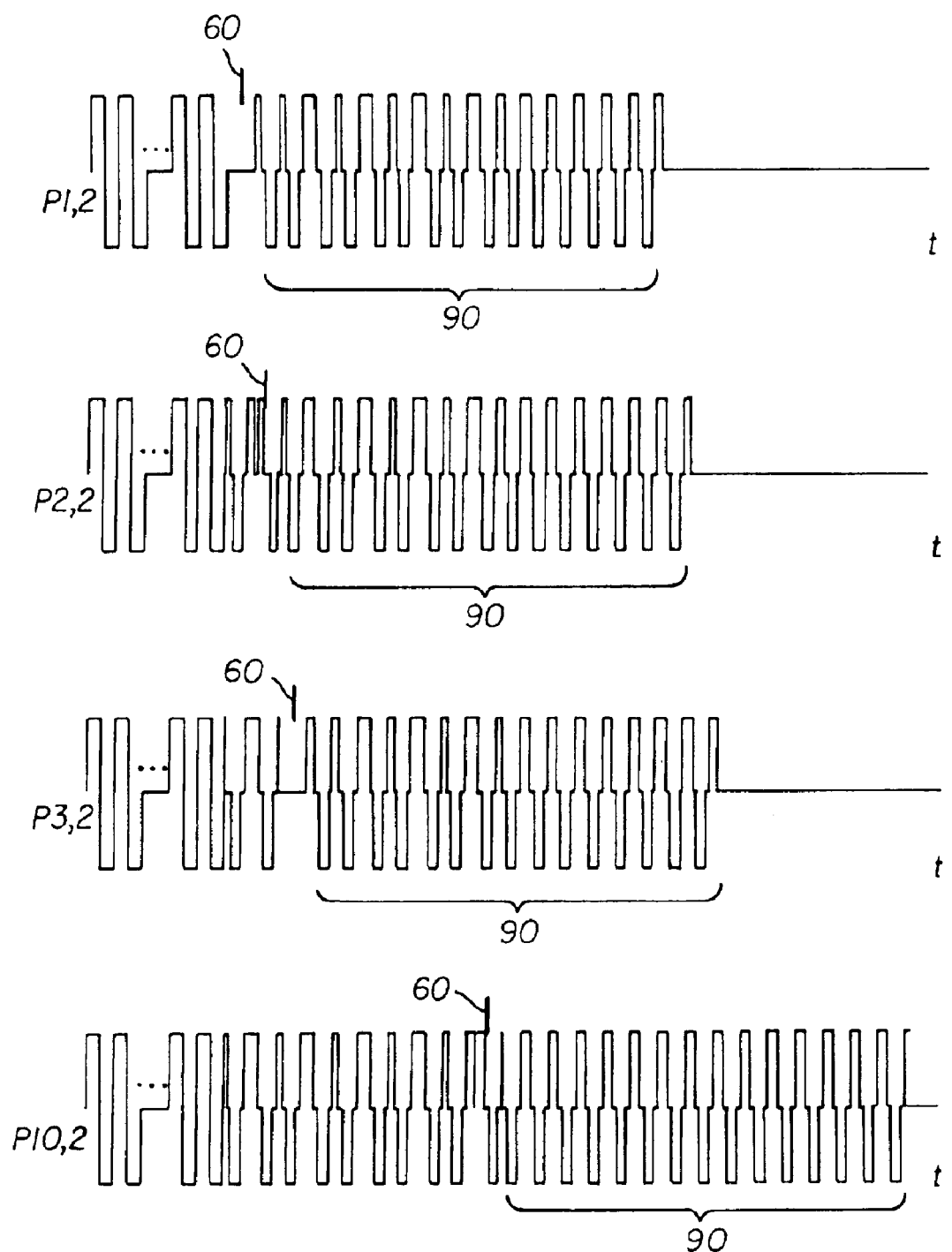

It is believed that the driving scheme according to the present invention is better understood referring to FIGS. 8A–8D. FIG. 8A illustrates a schematic diagram of a matrix cholesteric liquid crystal display with 10 rows and 2 columns. Row electrodes 1, 2, 3, and 10 are connected to row drivers 164 shown in FIG. 4C which output voltages $V_{R1}$, $V_{R2}$, $V_{R3}$, and $V_{R10}$, respectively. Column electrodes 1 and 2 are attached to column drivers 162 shown in FIG. 4C which output voltages $V_{Col1}$ and $V_{Col2}$, respectively. All row and column voltages are either U or 0 programmed according to the present invention. The letter "P" and "F" at the intersection of a row electrode and a column electrode indicate the planar and focal conic states of the display after it is addressed, respectively. R1, R2, R3, R10, C1, and C2 in FIG. 8B show the detailed time sequences of voltages connected to $V_{R1}$, $V_{R2}$, $V_{R3}$, $V_{R10}$, $V_{C1}$ and $V_{C2}$, respectively. FIG. 8C shows the detailed time sequences of voltages across pixels $P_{1,1}$, $P_{2,1}$, $P_{3,1}$, and $P_{10,1}$, which are all connected to Column 1, where $P_{i,j}$ (i=1,2,3, ... , 10; j=1,2) means the voltage across the pixel formed at the i-th row and the j-th column. Similarly, FIG. 8D shows the detailed time sequences of voltages across pixels $P_{1,2}$, $P_{2,2}$, $P_{3,2}$, and $P_{10,2}$, which are all connected to Column 2. In both FIG. 8C and FIG. 8D, the total pixel evolution time 90 after the selection step 60 remains substantially the same for pixels on all rows. This is achieved by fixing the phase of all column voltages while changing the phase of row voltages such that after the pixel evolution time 90 the row voltage is always in phase with the column voltage and therefore the voltage across the respective pixel is zero. It should be understood that the pixel evolution time 90 for all rows can be achieved by various ways within the scope of the invention.

Figure 9A:
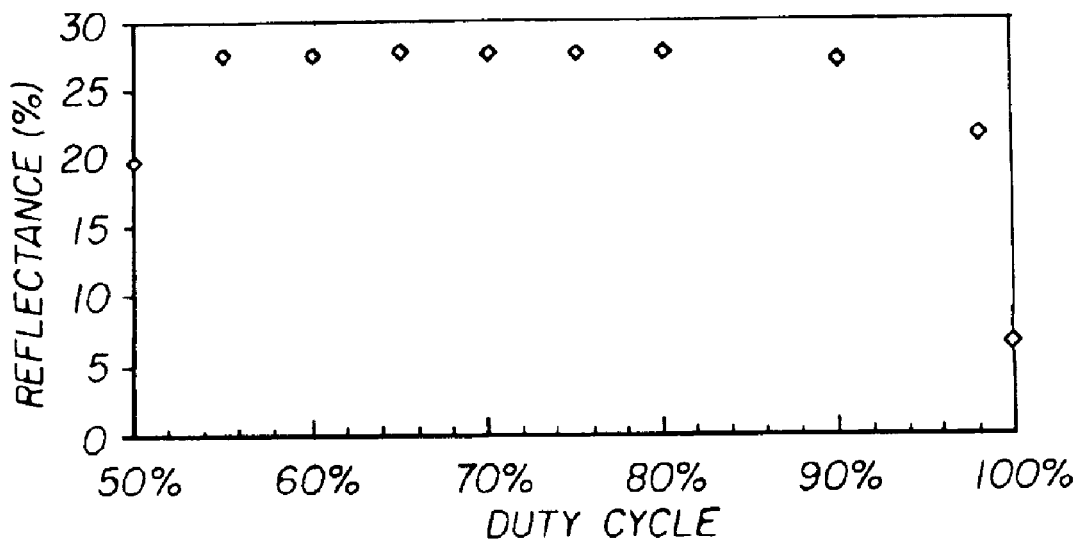
FIG. 9A and FIG. 9B show comparative results of reflectance and contrast for different duty cycles during the holding-selection step.
Figure 9B:
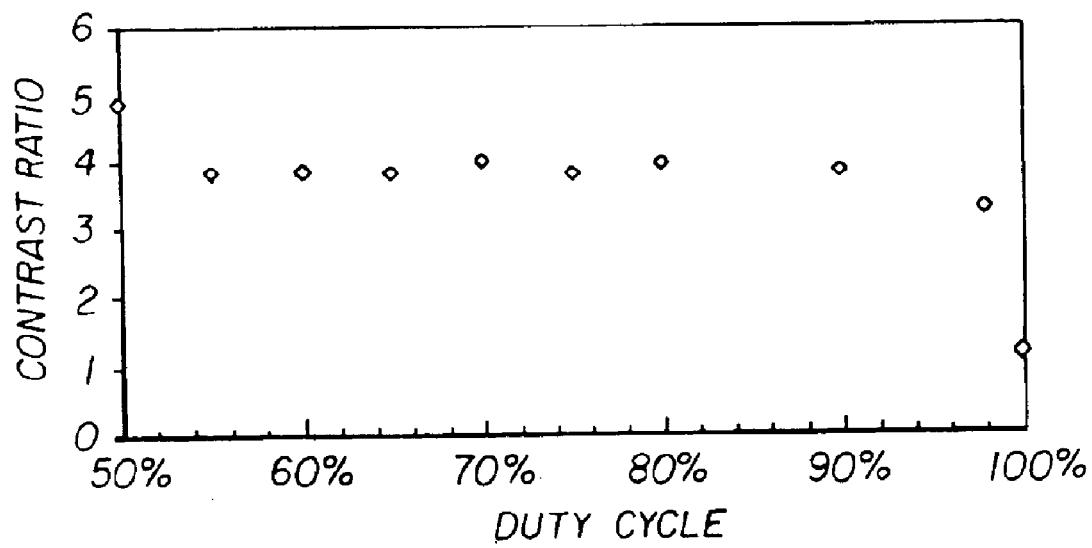
Figure 10A:
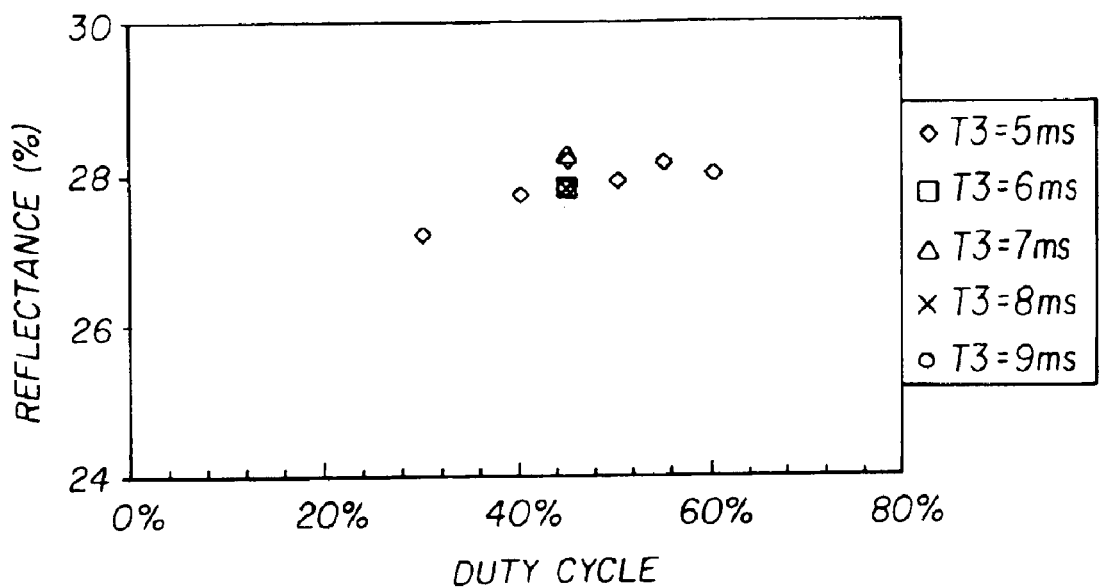
FIG. 10A and FIG. 10B show comparative results of reflectance and contrast for different duty cycles during the evolution step.
Figure 10B:
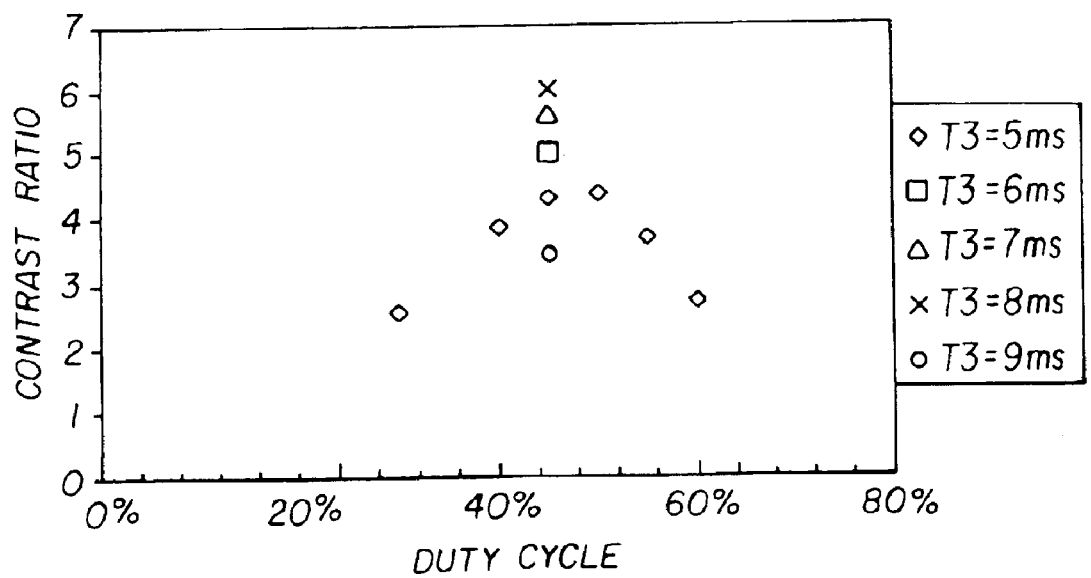
Figure 11A:
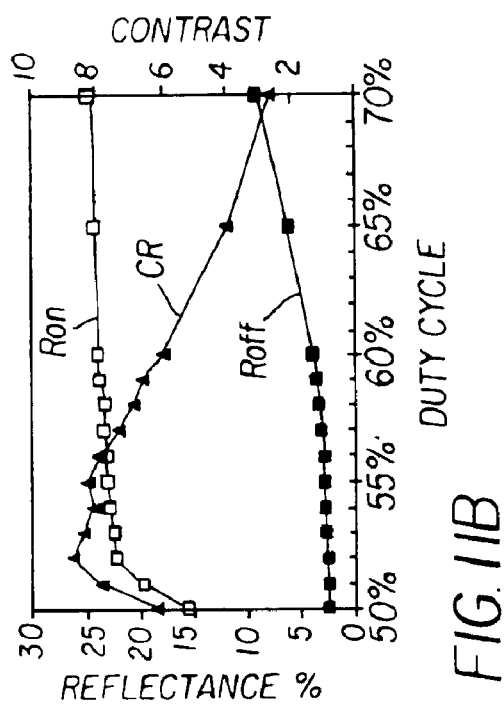
FIGS. 11A–11D show comparative results of reflectance and contrast for different maximum voltages (105 V, 110 V, 115 V and 120 V) for different duty cycles during the holding-selection step.
Figure 11B:
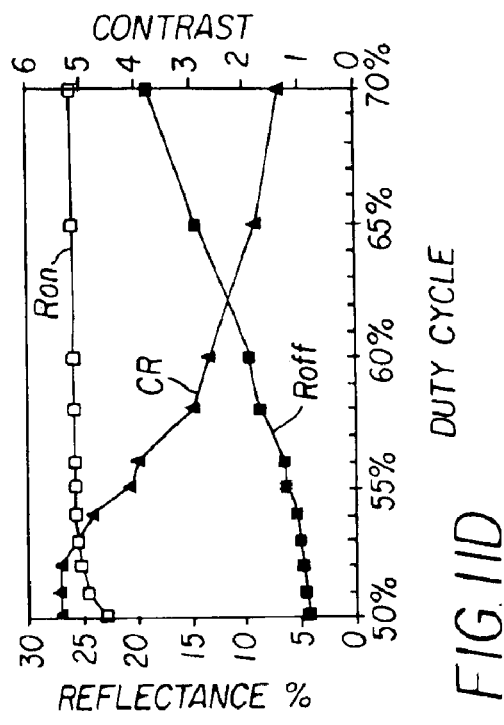
Figure 11C:
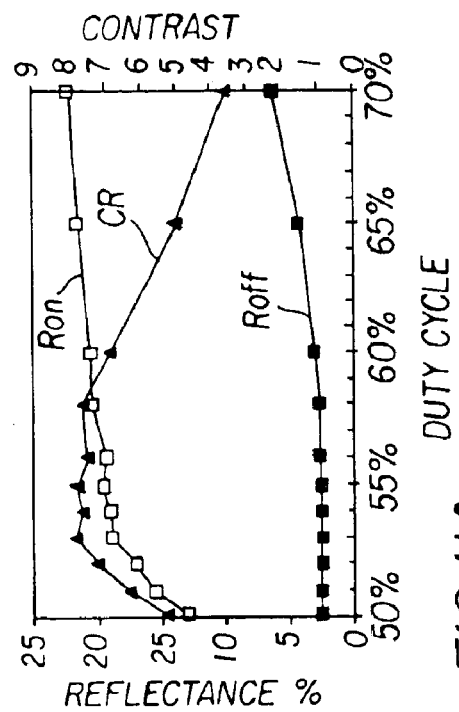
Figure 11D:
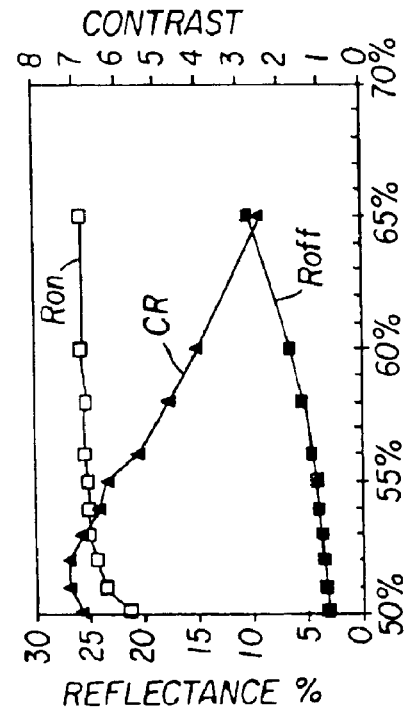

Now experimental measurements are taken using cholesteric liquid crystals displays made according to commonly assigned U.S. patent application Ser. No. 09/923,659, filed Aug. 7, 2001 by Xiang-Dong Mi et al., the disclosure of which is incorporated herein by reference. The reflectance was measured at peak wavelength around 550 nm. The contrast ratio is the ratio of reflectance of the on-state (planar state) over that of off-state (focal conic state). In all following experiments, the period of preparation phase t1=1 ms, and number of its cycle N1=40. Referring to FIGS. 9A and 9B, there are shown reflectance and contrast ratio as a function of duty cycle of selected on-state pixel voltage $V_{pson}$ in holding-selection step, respectively, using the waveform according to FIG. 6C, in which the duty cycle of selected on-state pixel voltage varies from 50% to 100%. In this particular case, the duty cycles of pixel voltage in preparation and evolution steps are 100% and 40%, respectively. It indicates that both on-state reflectance and contrast vary with duty cycle of selected on-state pixel voltage $V_{pson}$, and 50% or 66% duty cycle does not necessarily result in optimized reflectance and contrast. Similarly, FIGS. 10A and 10B shows reflectance and contrast ratio as a function of duty cycle of pixel voltage $V_p$ in evolution step according to $V_{p2}$ in FIG. 7B, respectively. This duty cycle can vary from 0% to 100%, however, in this example, it falls within a range of 30% to 60%. Different symbols correspond to different pixel evolution time T3, which equals the multiplication of the period of evolution time t3=1 ms and number of its cycle N3. N3 varies from 5 to 9. The duty cycle of selected on-state pixel voltage $V_{pson}$ is 70%. It can be seen that when all other parameters are fixed, the reflectance and contrast ratio can be optimized by varying the duty cycle of evolution step. Both FIGS. 9A and 9B, and FIGS. 10A and 10B suggest that the duty cycles of holding-selection step and evolution step which lead to optimized reflectance and contrast may not be 50% or 66%, therefore by varying the duty cycles of holding-selection step and evolution step, one can boost the reflectance and contrast ratio. Additional experiments also show that by varying the period and number of cycle of holding-selection step and evolution step, reflectance and contrast ratio can be further improved.

Each of FIGS. 11A, 11B, 11C, and 11D shows the reflectance of on-state (planar state) Ron (empty squares), the reflectance of off-state (focal conic state) Roff (filled squares), and the contrast ratio CR=Ron/Roff (upper triangles) change with duty cycle of pixel voltage across non-selected rows $V_{pnson}$ (or $V_{pnsoff}$) in the holding-selection step 70 according to FIG. 6C. All periods of preparation, holding-selection, and evolution steps are fixed as t1=1 ms, t2=1 ms, and t3=1 ms, respectively. The number of cycles in preparation and evolution steps are N1=40 and N2=20, respectively. The amplitude of voltage U varies in those figures such as 105 V, 110 V, 115 V, and 120 V. Nrow is chosen to be 1. It shows that optimized reflectance Ron and contrast ratio CR can be achieved by varying duty cycle and U. When U=110 V (FIG. 11B), the optimized contrast is above 8 and reflectance is around 22% at a duty cycle of 52%. When U=115 V (FIG. 11C), the optimized contrast ratio decreases to 7 while the reflectance increases to 25% at a duty cycle of 52%. When voltage U rises to 120 V (FIG. 11D), although the reflectance saturates at 26%, the contrast ratio drops significantly. When U is too low, such as 105 V (FIG. 11A), the maximum reflectance is only around 20% when the contrast ratio reaches the peak of 7.8. High or low amplitude U does not necessarily produce maximum reflectance Ron and contrast ration CR.

Figure 12A:
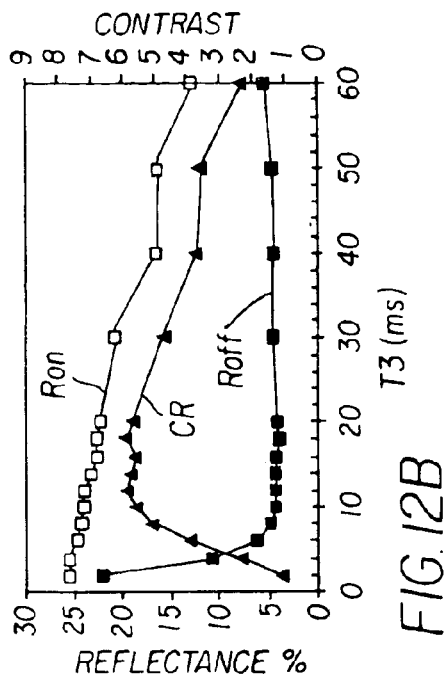
Figure 12B:
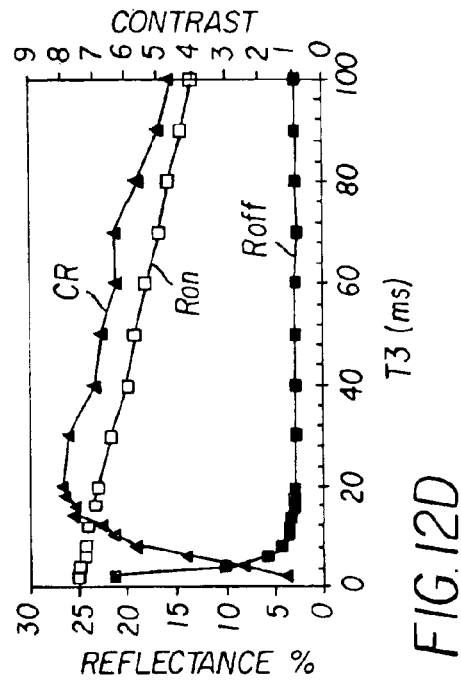
Figure 12C:
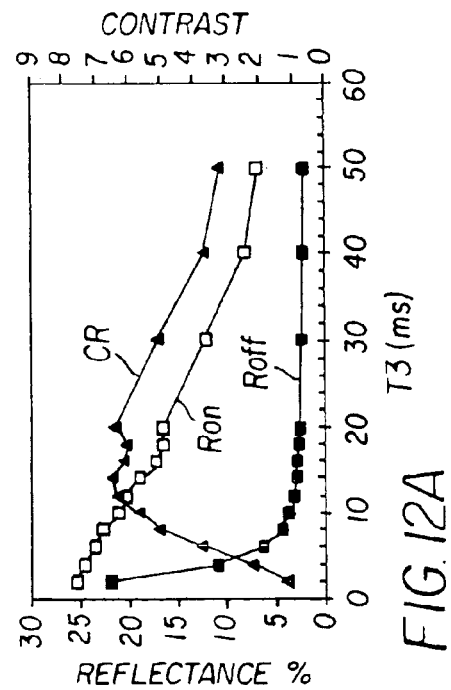
Figure 12D:
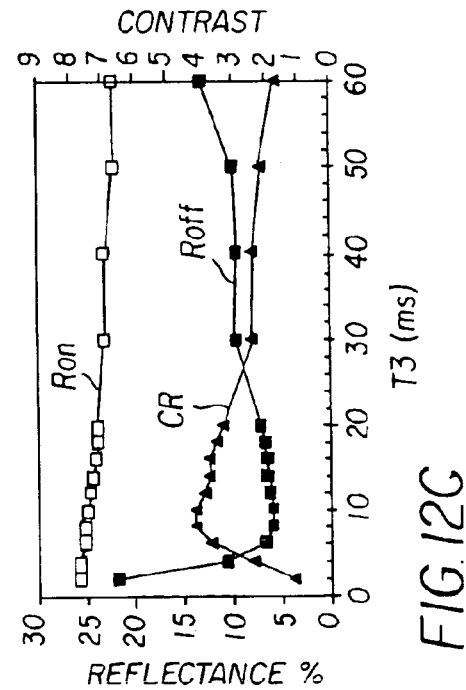
FIG. 12D shows comparative results for similar maximum voltage and different duty cycles and various pixel evolution times.

FIG. 12A through FIG. 12D is similar to FIG. 11A through FIG. 11D, except that the pixel evolution time T3 90 varies also. FIGS. 12A, 12B, and 12C have a common duty cycle of non-selected pixel voltage fixed at 50% and different voltage amplitude U equal to 120 V, 130 V, and 110 V, respectively. In FIG. 12D, the duty cycle is fixed at 55% and the voltage amplitude U equals 110 V. This set of measurements show that both reflectance Ron and contrast ratio CR decrease when the total duration T3 (pixel evolution time) counted from selection step becomes long. Therefore, to reduce variation in contrast and on-state reflectance across all rows, it is essential controlling the total duration after selection step, in particular keeping the total duration after selection step substantially constant across all rows. Additional experiments also show that when the pixel evolution time T3 90 as counted from the selection step is fixed, there is still a small variation in contrast and on-state reflectance across rows. This problem is significantly eliminated by introducing the preparation-holding step as shown in FIG. 4B.

In summary, for any given cholesteric liquid crystal display with the number of rows designated as Nrow, in addition to the voltage level U, the pixel voltages in the preparation step and evolution step have three independent variables: duty cycle, period (or frequency), and number of cycle, and the holding-selection step has two independent variables: duty cycle and period (or frequency). All these parameters are adjustable for optimized contrast and brightness.

In general, by varying duty cycle and phase of row and column voltages, the effective pixel voltages for the preparation step, pre-holding (or post-holding) step, selection step, and evolution step can all be different, therefore this drive scheme can achieve high performances as the 3-step and the 5-step dynamic driving scheme (U.S. Pat. Nos. 5,748,277 and 6,154,190) which have different voltage levels for different steps. Furthermore, the frequencies of row and column voltages can be varied in different steps to optimize contrast ratio and reflectance simultaneously.

It should be mentioned that there are various options for the waveforms within the spirit of this invention.

The invention has been described in detail with particular reference to certain preferred embodiments thereof, but it will be understood that variations and modifications can be effected within the spirit and scope of the invention.

| PARTS LIST | |
|---|---|
| 10 | display |
| 15 | substrate |
| 20 | first patterned conductors |
| 22 | planar state |
| 24 | focal conic state |
| 25 | homeotropic state |
| 26 | incident light |
| 27 | transmitted light |
| 28 | reflected light |
| 30 | polymer dispersed cholesteric layer |
| 40 | second patterned conductors |
| 50 | preparation step |
| 52 | conventional preparation step |
| 55 | preparation-holding step |
| 60 | selection step |
| 65 | pre-holding step |
| 70 | holding-selection step |
| 75 | post-holding step |
| 80 | evolution step |
| 90 | pixel evolution time |
| 100 | voltage source |
| 120 | control electronics |
| 122 | duty cycle controller |
| 124 | phase controller |
| 126 | frequency controller |
| 132 | column pulses |
| 136 | row pulses |
| 150 | display |
| 152 | row driver |
| 154 | column driver |

-continued

| PARTS LIST | |
|---|---|
| 162 | column electrodes |
| 164 | row electrodes |
| 210 | the row written firstly |
| 220 | the row written intermediately |
| 230 | the row written lastly |
| U | maximum voltage |
| $U_{row}$ | row voltage |
| $U_{column}$ | column voltage |
| $V_r$ | row voltage |
| $V_c$ | column voltage |
| $V_p$ | voltage across a pixel |
| $V_{rs}$ | row voltage on a selected row |
| $V_{rns}$ | row voltage on a non-selected row |
| $V_{con}$ | column voltage for on-state |
| $V_{coff}$ | column voltage for off-state |
| $V_{cg0}$ | column voltage for gray level 0 |
| $V_{cg1}$ | column voltage for gray level 1 |
| $V_{cg2}$ | column voltage for gray level 2 |
| $V_{cg3}$ | column voltage for gray level 3 |
| $V_{cg4}$ | column voltage for gray level 4 |
| $V_{psg0}$ | pixel voltage on selected rows for gray level 0 |
| $V_{psg1}$ | pixel voltage on selected rows for gray level 1 |
| $V_{psg2}$ | pixel voltage on selected rows for gray level 2 |
| $V_{psg3}$ | pixel voltage on selected rows for gray level 3 |
| $V_{psg4}$ | pixel voltage on selected rows for gray level 4 |
| $V_{pnsg0}$ | pixel voltage on non-selected rows for gray level 0 |
| $V_{pnsg1}$ | pixel voltage on non-selected rows for gray level 1 |
| $V_{pnsg2}$ | pixel voltage on non-selected rows for gray level 2 |
| $V_{pnsg3}$ | pixel voltage on non-selected rows for gray level 3 |
| $V_{pnsg4}$ | pixel voltage on non-selected rows for gray level 4 |
| $V_{pson}$ | voltage across selected on-state pixel |
| $V_{psoff}$ | voltage across selected off-state pixel |
| $V_{pnson}$ | voltage across non-selected on-state pixel |
| $V_{pnsoff}$ | voltage across non-selected off-state pixel |
| $V_{r1}, V_{r2}, V_{r3}, V_{r4}, V_{r5}, V_{r6}, V_{r7}$ | row voltages in evolution step |
| $V_{c1}, V_{c2}, V_{c3}, V_{c4}, V_{c5}, V_{c6}, Vc_7$ | column voltages in evolution step |
| $V_{p1}, V_{p2}, V_{p3}, V_{p4}, V_{p5}, V_{p6}, V_{p7}$ | pixel voltages in evolution step |
| $V_{R1}$ | row voltage on the first row |
| $V_{R2}$ | row voltage on the second row |
| $V_{R3}$ | row voltage on the third row |
| $V_{R10}$ | row voltage on the 10-th row |
| $V_{Col1}$ | column voltage on column 1 |
| $V_{Col2}$ | column voltage on column 2 |
| $V_1$ | voltage below which states of cholesteric liquid crystals do not change |
| $V_2, V_3$ | voltages at which cholesteric liquid crystals are switched into focal conic state |
| $V_4$ | voltage above which cholesteric liquid crystals are switched into planar state after the voltage is turned off quickly |
| R1 | row pulse train on row 1 |
| R2 | row pulse train on row 2 |
| R3 | row pulse train on row 3 |
| R10 | row pulse train on row 10 |
| C1 | column pulse train on column 1 |
| C2 | column pulse train on column 2 |
| $P_{i,j}$ | pixel pulse train on pixel formed at row i and column j (i = 1, 2, 3, . . . 10; j = 1, 2) |
| t | time |
| β2 | phase factor in holding-selection step |
| β3 | phase factor in evolution step |
| α1 | duty cycle of row and column voltage pulses in preparation step |
| α2 | duty cycle of row and column voltage pulses in holding-selection step |
| α3 | duty cycle of row and column voltage pulses in evolution step |
| dc1 | duty cycle of pixel voltage pulses in preparation step |
| dc3 | duty cycle of pixel voltage pulses in evolution step |
| t1 | period of preparation step |

-continued

PARTS LIST

| | |
|---|---|
| t2 | period of holding-selection step |
| t3 | period of evolution step |
| T3 | pixel evolution time (or duration) counted from selection step |
| N1 | number of cycle in preparation step |
| N2 | number of cycle in holding-selection step |
| N3 | number of cycle in evolution step |
| Ron | Reflectance of on-state (planar state) |
| Roff | Reflectance of off-state (focal conic state) |
| CR | Contrast ratio (Ron/Roff) |
| F | focal conic |
| P | planar |
| P11 | pixel pulse train on pixel formed at row 1 and column 1 |
| P32 | pixel pulse train on pixel formed at row 3 and column 2 |
| $P_{1,1}$ | pixel pulse train on pixel formed at row 1 and column 1 |
| $P_{2,1}$ | pixel pulse train on pixel formed at row 2 and column 1 |
| $P_{3,1}$ | pixel pulse train on pixel formed at row 3 and column 1 |
| $P_{10,1}$ | pixel pulse train on pixel formed at row 10 and column 1 |
| $P_{1,2}$ | pixel pulse train on pixel formed at row 1 and column 2 |
| $P_{2,2}$ | pixel pulse train on pixel formed at row 2 and column 2 |
| $P_{3,2}$ | pixel pulse train on pixel formed at row 3 and column 2 |
| $P_{10,2}$ | pixel pulse train on pixel formed at row 10 and column 2 |
| Nrow | number of rows |

What is claimed is:

1. A method of writing pixels in a cholesteric liquid crystal display having opposing rows and columns of electrodes and cholesteric liquid crystal material disposed between said rows and columns of electrodes, the cholesteric liquid crystals having a plurality of reflective states, comprising the steps of:
 a) in a first preparation step, applying row and column voltage pulses, all pulses having the same minimum voltage and the same maximum voltage with a duty cycle of approximately 50% and adjusting the relative phase of the row and column voltage pulses to provide a bipolar field with a duty cycle varying from 90% to 100% across the cholesteric material and sufficient to produce a field that causes the cholesteric material to be in a homeotropic state;
 b) in a second holding-selection step, applying row and column voltage pulses and with the same minimum and maximum voltages, adjusting the duty cycles of the row and column voltage pulses to be the same and adjusting the relative phase between the row and column pulses of selected ON pixels to write ON data into the selected ON pixels and adjusting the relative phases of selected OFF pixels to be in phase to write OFF data into the selected OFF pixels; and
 c) in a third evolution step applying row and column voltage pulses at the same minimum and maximum voltages with substantially the same duty cycle and with different relative phases to cause the pixels to evolve to a written reflective state.

2. The method of claim 1 wherein the step of adjusting the relative phase of the row and column voltage pulses for selected pixels is varied to write gray level data into the selected pixels.

3. The method of claim 1 wherein the step of holding-selection comprises applying row and column voltage pulses at the maximum voltage with a duty cycle varying from 0% to 50% and sequentially writing rows of data by changing the relative phase of pulses in the columns of each row to produce a bipolar field with a duty cycle varying from 0% to 50% across pixels on non-selected rows and a bipolar field with a duty cycle substantially equal to zero on selected-Off pixels, and thereby selecting the final optical state of each pixel.

4. The method of claim 1 wherein the step of holding-selection comprises, applying row and column voltage pulses at the maximum voltage with a duty cycle substantially close to 50% and sequentially writing rows of data by changing the relative phase of the pulses in columns of the selected row to produce a bipolar field with a duty cycle varying from 50% to 100% across pixels on non-selected rows and a bipolar field with a duty cycle substantially equal to zero on selected-Off pixels, and thereby selecting the final optical state of each pixel.

5. The method of claim 1 wherein the evolution step comprises applying row and column voltage pulses at the maximum voltage with a duty cycle varying from 0% to 50% and producing a bipolar field across all pixels with a duty cycle varying from 0% to 100% and changing the phase of the column voltage pulses relative to the row voltage pulses to cause the pixels to evolve to a written reflective state.

6. The method of claim 1 wherein the evolution step comprises applying row and column voltage pulses at the maximum voltage with a duty cycle substantially close to 50% and producing a bipolar field across all pixels with a duty cycle varying from 50% to 100% by changing the phase of the column voltage pulses relative to the row voltage pulses to cause the pixels to evolve to a written reflective state.

7. The method of claim 1 wherein the evolution step comprises applying row and column voltage pulses at the maximum voltage with a duty cycle varying from 0% to 50% and producing a bipolar field across all pixels with a duty cycle varying from 0% to 50% by changing the phase column voltage pulses relative to the row voltage pulses to cause the pixels to evolve to a written reflective state.

8. The method of claim 1 wherein the evolution step comprises applying row and column voltage pulses at the maximum voltage with a duty cycle varying from 0% to 25% and producing a bipolar field across all pixels with a duty cycle varying from 0% to 50% by changing the phase of the row and column voltage pulses relative to the row voltage to cause the pixels to evolve to a written reflective state.

9. The method of claim 1 wherein the evolution step comprises applying row and column voltage pulses at the maximum voltage and producing a bipolar field across all pixels with the same duty cycle and the total duration counted from the image data are written in said holding-selection step by changing the phase of column voltage pulses relative to the row voltage pulses to cause the pixels to evolve to a written reflective state.

10. A method for writing data to pixels in a cholesteric liquid crystal display having a matrix of electrodes arranged in rows and in columns and a cholesteric liquid crystal material disposed between the rows and columns to form pixels in regions between overlapping row and column electrodes and for displaying image data in the pixels in accordance with electrical voltage applied to the electrodes of the rows and columns, the method comprising:
 a) generating one or more trains of pulses wherein the pulses in each train have a duty cycle, a relative phase with respect to each other, and only one of two amplitudes including a maximum amplitude and a minimum amplitude;
 b) applying one pulse train to the rows and another pulse train to the columns during one or more steps of the group comprising preparation, preparation-holding, pre-holding, selection, post-holding, and evolution; and
 c) adjusting duty cycle and relative phases of the pulse trains applied to the row and column electrodes during one or more of the steps for writing image data to a pixel, or adjusting contrast and reflectance of a pixel, or adjusting gray level of a pixel.

11. The method of claim 10 wherein during the preparation step the row and column pulse trains are adjusted to have the same duty cycle and are entirely out of phase with each other.

12. The method of claim 10 wherein during the preparation-holding step the row pulse train is longer for the earlier written rows and shorter for later written rows.

13. The method of claim 10 wherein during the selection step pixels are written to an ON state by adjusting the phase of the row and column pulses to have duty cycles that overlap each other and varying that overlap from more than 0% to 100% across selected pixels and pixels are written to an OFF state by adjusting the relative phases of the row and column pulses so that their duty cycles do not overlap.

14. The method of claim 10 wherein the duty cycles are adjusted during the pre-holding, selection, and post-holding steps to improve contrast and reflectance.

15. The method of claim 10 wherein during the post-holding and evolution steps the row pulses are adjusted to have the same duty cycle for all rows.

16. The method of claim 10 wherein gray level of the selected pixels is adjusted during the selection step by having the same duty cycle for the row and the column pulses trains and by phase shifting the overlap between the column pulse train with respect to the row pulse train.

17. The method of claim 16 wherein the non-selected pixels have a row pulse train of the same duty cycle as the column pulse train but a frequency of multiple times the column frequency.

18. The method of claim 10 wherein after the selection step the duty cycle of the pulses across the pixels is the same.

19. The method of claim 10 wherein during pre-holding, selection, and post-holding steps, the duty cycle of rows and columns is chosen to be long enough to write pixels to a selected-ON state and not so long as to write pixels to a selected-OFF state.

20. A display apparatus for cholesteric liquid crystal display comprising:
   a) a matrix of electrodes arranged in rows and in columns, the regions between overlapping row and column electrodes defining pixels in the display;
   b) a cholesteric liquid crystal material disposed between the rows and columns for assuming a plurality of gray level states in response to the selective application of voltage signals to the rows and columns;
   c) control electronics for generating one or more trains of pulses wherein the pulses in each train have a duty cycle, a relative phase with respect to other pulse trains, and only one of two amplitudes including a maximum amplitude and a minimum amplitude, said control electronics including:
      i) phase control means for adjusting the phase between row and column pulse trains;
      ii) duty cycle control means for adjusting the duty cycle of the row and column pulse trains; and
      iii) the phase and duty cycle control means are operable during one or more of preparation, preparation-holding, pre-holding, selection, post-holding and evolution in order to control writing image data to a pixel, or adjusting contrast and reflectance of a pixel, or adjusting gray level of a pixel.

21. The apparatus of claim 20 wherein the phase control means shifts the phase of the row and column pulse trains with each other and the duty cycle control means sets the duty cycle of the row and column pulses to be the same in order to perform the preparation step.

22. The apparatus of claim 21 wherein the duty cycle control means adjusts the duty cycle in accordance with the time the row is prepared.

23. The apparatus of claim 20 wherein the duty cycle control means and the phase control means write selected pixels to an ON gray level state by setting the duty cycles of the row and column to be the same and varying the relative phase between the duty cycles of the row and column pulses.

24. The apparatus of claim 20 wherein the duty cycle control means is adjusted during the pre-holding, selection, and post-holding steps to improve contrast and reflectance.

25. The apparatus of claim 20 wherein the duty cycle control means adjusts the row duty cycles to be the same for all rows during the post-holding and evolution steps.

26. The apparatus of claim 20 the phase shift control means shifts the relative phase between the row and column pulses during the selection step to vary the gray level of the pixels.

27. The apparatus of claim 26 wherein the duty cycle control means sets the duty cycles of the non-selected pixels to have the same duty cycle during the selection step.

28. The apparatus of claim 27 further comprising frequency control means for adjusting the frequency of the row and column pulse trains to set the frequency of the one of the pulse trains at a multiple of the frequency of the other pulse train.

29. The apparatus of claim 20 wherein the duty cycle control means provides the same duty cycles across all pixels after the select step is completed.

30. The apparatus of claim 29 wherein the means for controlling the duty cycle during pre-holding, selection, and post-holding steps sets the duty cycle of rows and columns to be long enough to write pixels to a selected-ON state and not so long as to write pixels to a selected-OFF state.

31. A cholesteric liquid crystal display comprising:
   a) a matrix of electrodes arranged in rows and columns, the regions between overlapping row and column electrodes defining pixels in the display;
   b) a cholesteric liquid crystal material disposed between the rows and columns for assuming one of two stable states in response to the selective application of voltage signals to the rows and columns;
   c) means for generating one or more trains of pulses wherein the pulses in each train have a duty cycle, a phase with respect to each other, and only one of two amplitudes including a maximum amplitude and a minimum amplitude, said control electronics including:
      i) means for controlling phase between row and column pulse trains;
      ii) means for controlling duty cycle of the row and column pulse trains; and
      iii) the means for controlling phase and duty cycle are operable during one or more of preparation, preparation-holding, pre-holding, selection, post-holding and evolution in order to control writing image data to a pixel, or adjusting contrast and reflectance of a pixel, or adjusting gray level of a pixel.

32. The apparatus of claim 31 wherein the means for controlling the phase shifts the phase of the row and column pulse trains out with each other and the means for controlling the duty cycle sets the duty cycle of the row and column pulses to be the same in order to perform the preparation step.

33. The apparatus of claim 32 wherein the means for controlling the duty cycle adjusts the duty cycle in accordance with the time the row is prepared.

34. The apparatus of claim 31 wherein the means for controlling the duty cycle and the means for controlling the phase write selected pixels to an ON gray level state by setting the duty cycles of the row and column to be the same and varying the relative phase between the duty cycles of the row and column pulses.

35. The apparatus of claim 31 wherein the means for controlling duty adjusts the duty cycle during the pre-holding and post-holding steps to improve contrast and reflectance.

36. The apparatus of claim 31 wherein the means for controlling duty adjusts the row duty cycles to be the same for all rows during the post-holding and evolution steps.

37. The apparatus of claim 31 the means for controlling phase shift control shifts the relative phase between the row and column pulses during the selection step to vary the gray level of the pixels.

38. The apparatus of claim 37 wherein the means for controlling duty sets the duty cycles of the non-selected pixels to have the same duty cycle during the selection step.

39. The apparatus of claim 38 further comprising means for controlling frequency of the pulse trains and setting the frequency of the one of the pulse trains at a multiple of the frequency of the other pulse train.

40. The apparatus of claim 31 wherein the means for controlling duty cycle operates to provide the same duty cycles across all pixels after the selection step is completed.

41. The apparatus of claim 40 wherein the means for controlling the duty cycle during pre-holding, selection, and post-holding steps, sets the duty cycle of rows and columns long enough to write pixels to a selected-ON state and not so long as to write pixels to a selected-OFF state.

* * * * *